United States Patent
Yamashita et al.

(10) Patent No.: US 8,156,959 B2
(45) Date of Patent: Apr. 17, 2012

(54) BRANCHING UNIT FOR BORING WITHOUT STOPPING PASSAGE OF FLUID

(75) Inventors: Tamotsu Yamashita, Shiga (JP); Taihei Yokoyama, Shiga (JP)

(73) Assignee: Suiken Co., Ltd., Shiga (JP)

( * ) Notice: Subject to any disclaimer, the term of this patent is extended or adjusted under 35 U.S.C. 154(b) by 794 days.

(21) Appl. No.: 12/212,055

(22) Filed: Sep. 17, 2008

(65) Prior Publication Data
US 2009/0065070 A1    Mar. 12, 2009

Related U.S. Application Data

(63) Continuation-in-part of application No. PCT/JP2008/056877, filed on Apr. 7, 2008.

(30) Foreign Application Priority Data

Jun. 21, 2007  (JP) ................................. 2007-163937

(51) Int. Cl.
*F16L 41/04* (2006.01)
(52) U.S. Cl. .......................... 137/319; 137/318; 285/197
(58) Field of Classification Search .................. 137/317, 137/318, 319; 251/901; 285/197
See application file for complete search history.

(56) References Cited

U.S. PATENT DOCUMENTS

| | | | | |
|---|---|---|---|---|
| 5,183,364 A | * | 2/1993 | Hardwig | 408/67 |
| 5,435,340 A | * | 7/1995 | Tabuchi et al. | 137/318 |
| 5,924,436 A | * | 7/1999 | Kitani et al. | 137/15.09 |
| 6,068,019 A | * | 5/2000 | Lee | 137/318 |

FOREIGN PATENT DOCUMENTS

| | | |
|---|---|---|
| JP | 1-12033 | 4/1989 |
| JP | 06-074387 | 3/1994 |
| JP | 2002-098287 | 4/2002 |
| JP | 2002-321109 | 11/2002 |
| JP | 2004-245397 | 9/2004 |
| JP | 2006-207747 | 8/2006 |
| KR | 10-0784591 | 12/2007 |

OTHER PUBLICATIONS

Machine translation of JP 2006-207747 A.*
Written Opinion for corresponding International Application No. PCT/JP2008/056877 with English translation.

* cited by examiner

*Primary Examiner* — Eric Keasel
*Assistant Examiner* — Ian Paquette
(74) *Attorney, Agent, or Firm* — Renner, Otto, Boisselle & Sklar, LLP

(57) ABSTRACT

A branching unit for boring without stopping passage of fluid, which is suitable for forming an opening 11 at a pipe wall 12 by boring a part of the pipe wall 12 of an existing pipe 1 using a drill machine 3 having a hole saw 4 to connect a branch pipe to the existing pipe, comprising: a sealing case 20 having plurality of separate casing 21, 22 separated in a circumferential direction R and a branch pipe portion 27 protruding and branching off in the radial direction C; a valve body 5 rotating between an inner circumferential surface 29 of the separate casing 21, 22 and an outer circumferential surface 13 of the existing pipe 1 to open and close a branch hole 28; and a rotation mechanism 50 rotating the valve body 5.

13 Claims, 22 Drawing Sheets

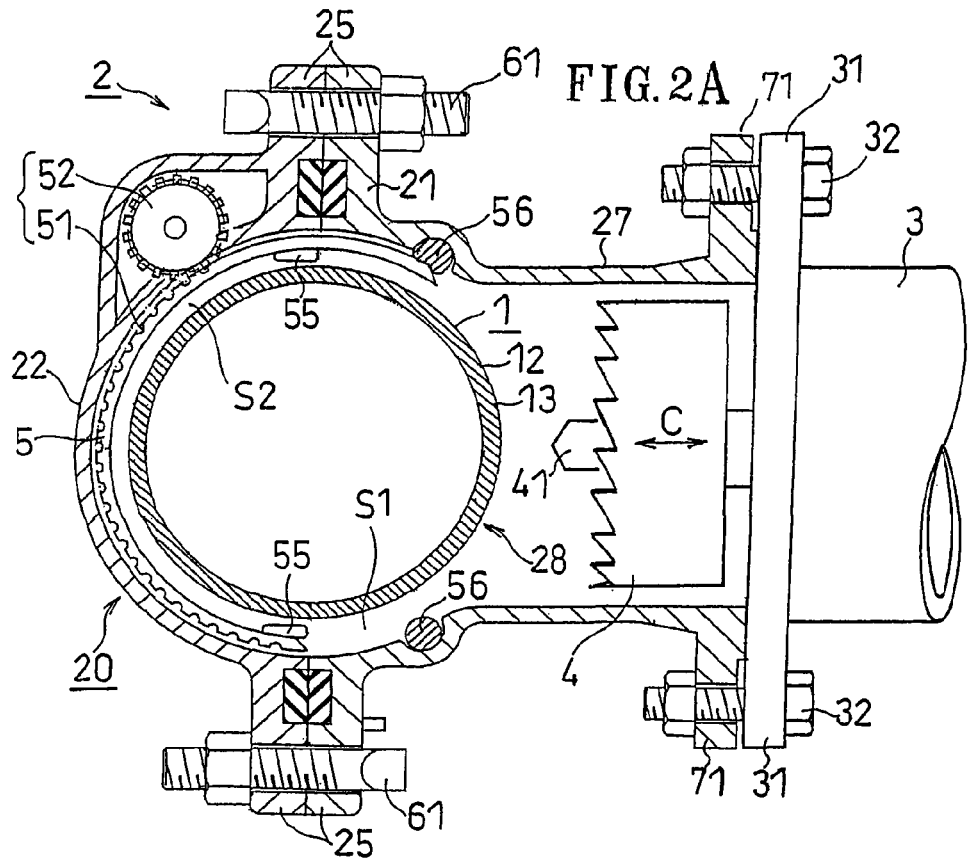
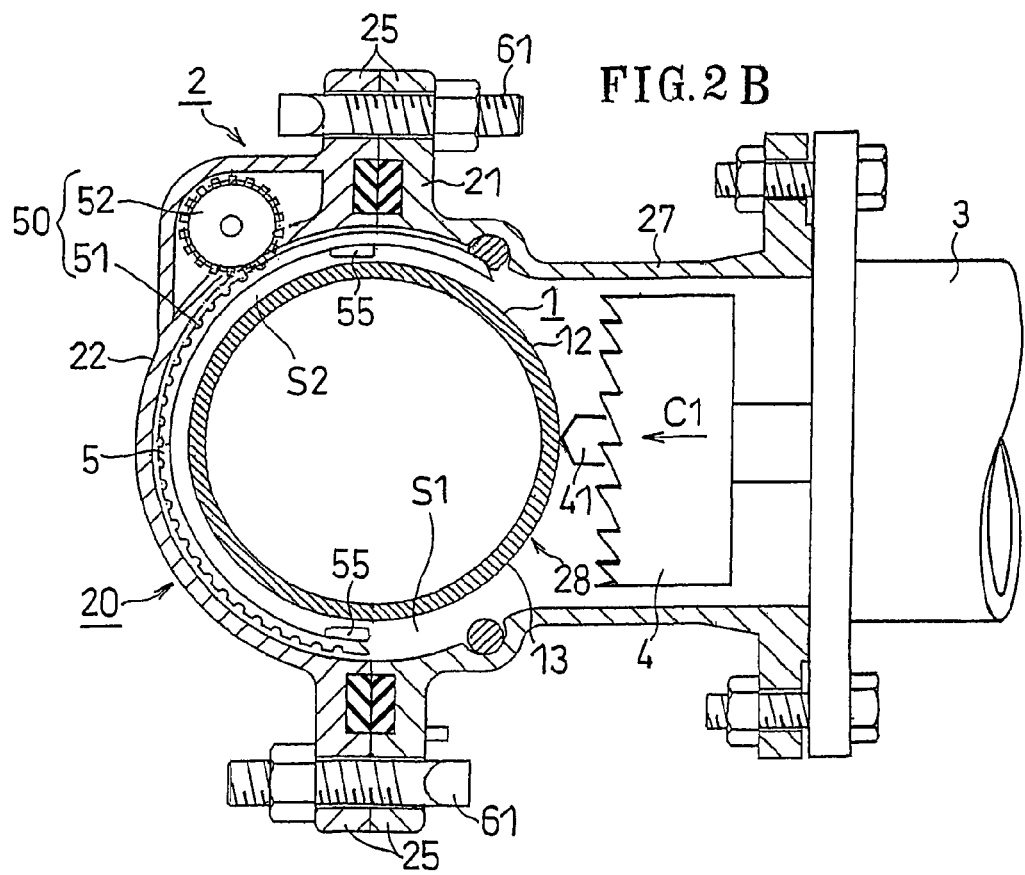

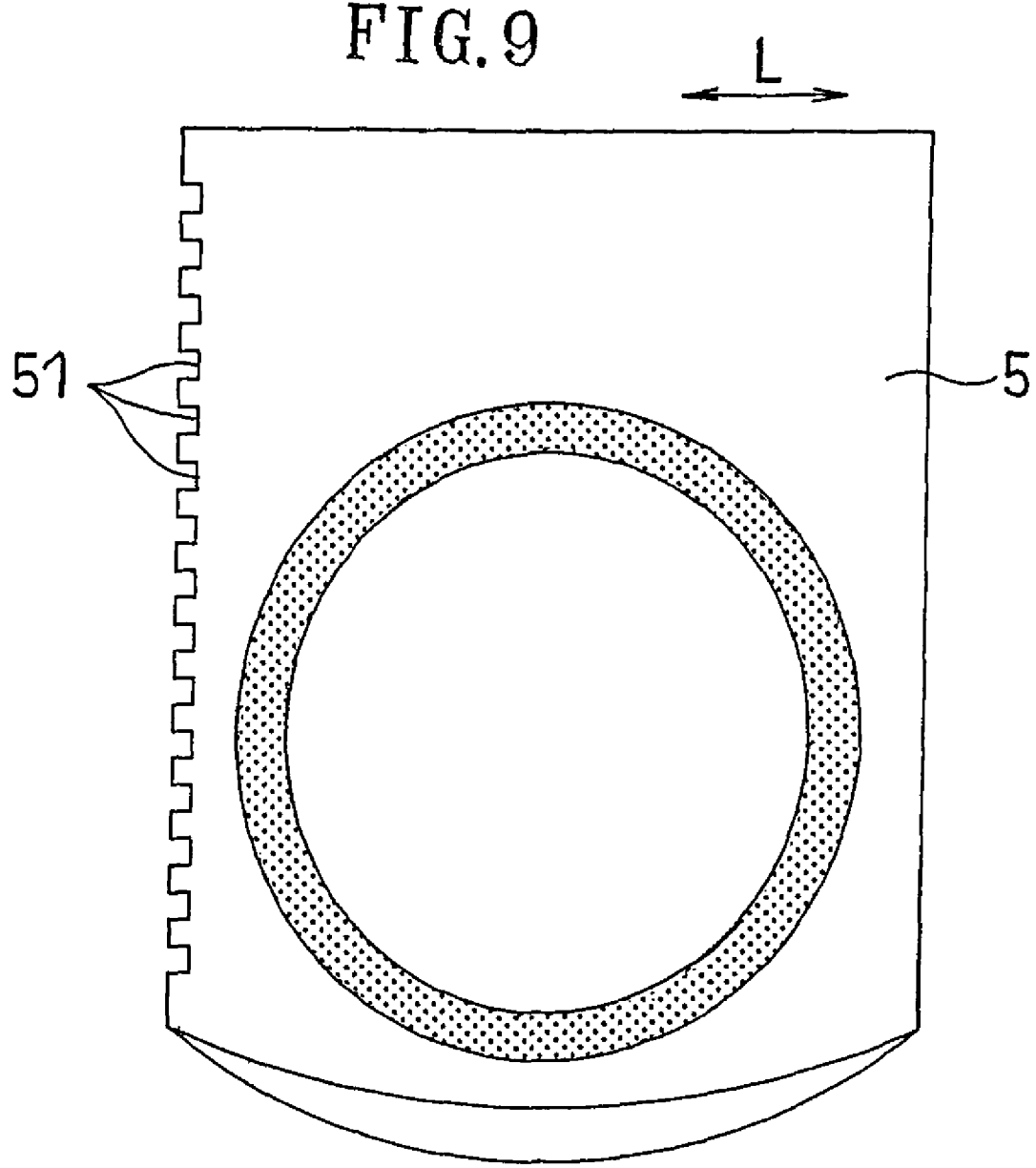

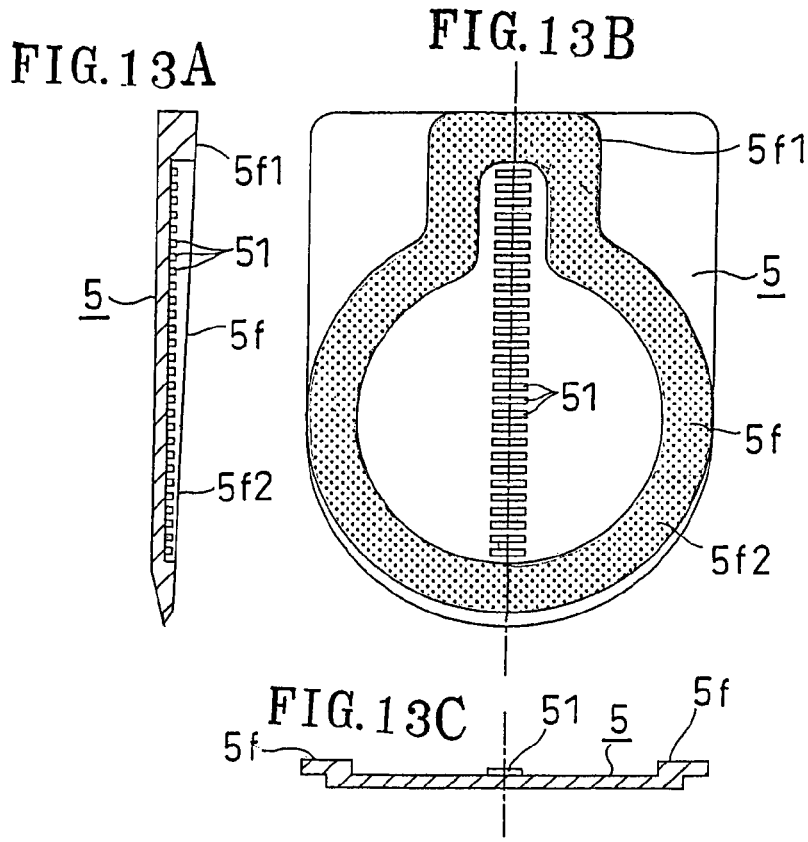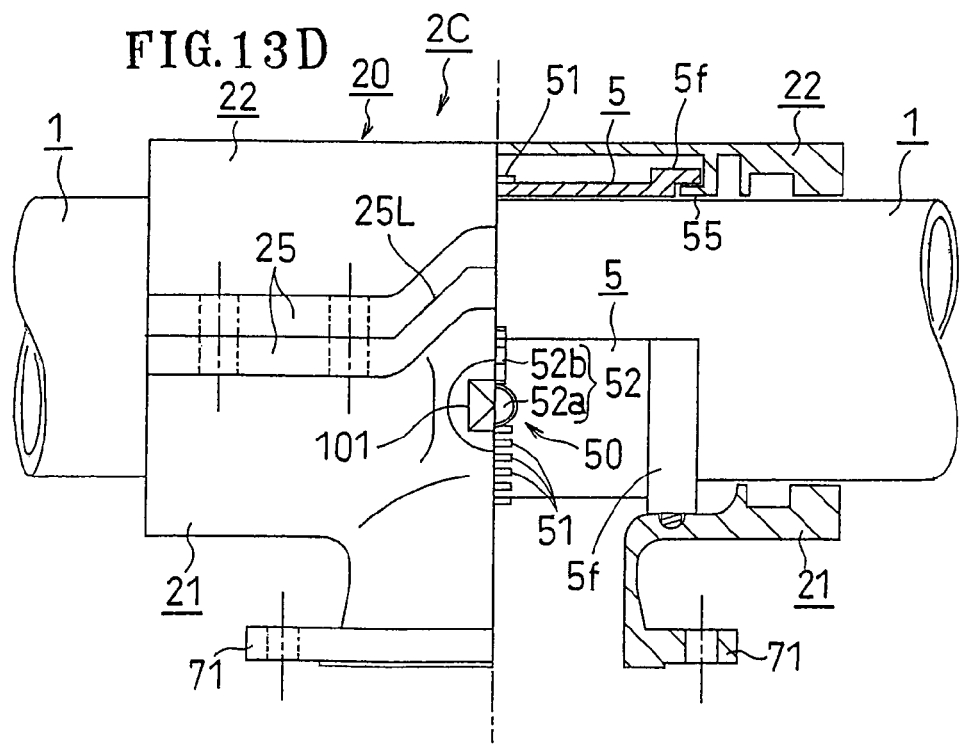

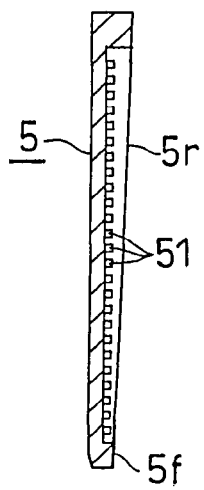
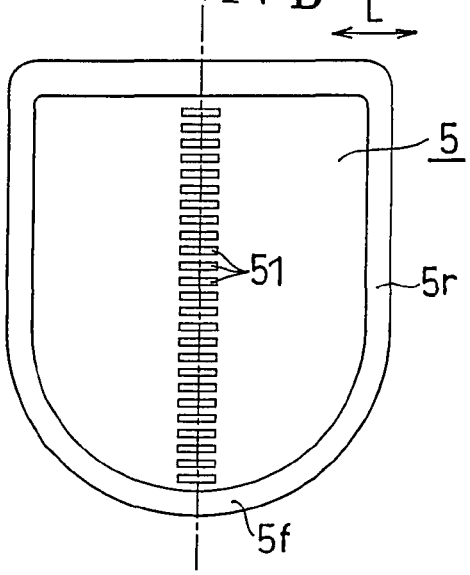
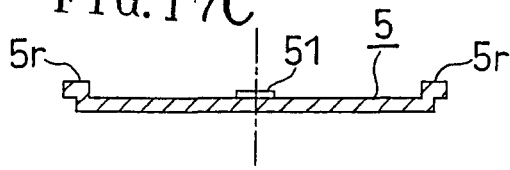
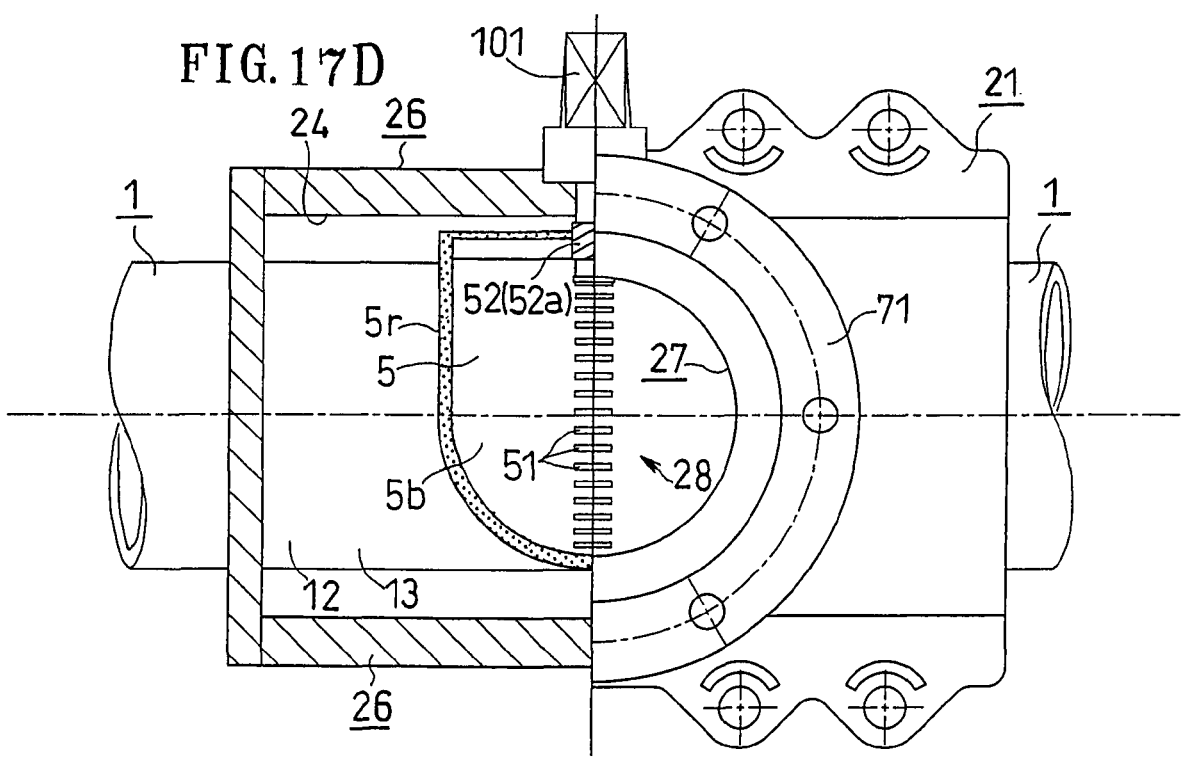

US 8,156,959 B2

BRANCHING UNIT FOR BORING WITHOUT STOPPING PASSAGE OF FLUID

CROSS-REFERENCE TO RELATED APPLICATIONS

This application is a continuation in part of the PCT international application No. PCT/JP2008/56877 filed on Apr. 7, 2008, which claims the priority on Japanese patent application number 2007-163937 filed in Japan on Jun. 21, 2007. The entire contents of all these applications are hereby incorporated herein by reference.

BACKGROUND OF THE INVENTION

1. Field of the Invention

The present invention relates to a branching unit for boring without stopping of fluid suitable for extracting a branch from an existing pipe such as water or gas pipe.

2. Background Art

As described in Japanese Patent Laid Open No. 2002-321109, a construction method in which a part of the existing pipe is drilled with a drill machine having a hole saw has been well-known.

Basic process of this drill construction will be briefly described.

As shown in FIG. 20A, a sealing case 2 consisting of a pair of a first separate casing 21 and a second separate casing 22 covers a part of an existing pipe 1. The first separate casing 21 is provided with a valve body (slice valve) 100. A drill machine 3 is subsequently mounted on the first separate casing 21.

As shown in FIG. 20B, the drill machine 3 operating a hole saw 4, the hole saw 4 rotates its chief axis and drills the existing pipe 1 to make an opening 11. Thereafter, as shown in FIG. 20C, the valve body 100 closes after the hole saw 4 is backed off. After the drill construction, the drill machine 3 is removed from the first separate casting 21, a branch pipe is connected to the first separate casing 21, a valve is opened by moving the valve body 100, thereby a branch construction is finished.

SUMMARY OF THE INVENTION

The conventional unit, however, has a large valve casing accommodating the valve body 100 which moves up and down is separately needed. Therefore, the conventional unit costs.

The valve body 100 moving up and down at a distance from the existing pipe 1, a stroke in which the hole saw 4 moves back and forth becomes long. Therefore, the drill machine 3 gets larger.

The valve body 100 moving up and down, an operation cap 101 of the valve gets taller. Therefore, a needed earth covering becomes deeper.

Japanese Patent Laid Open No. 6-74387 and 2006-207747 show a branching unit which accommodates an arc shaped valve body between a saddle having a branch hole and an existing pipe. The valve body blocks the branch hole by moving in a circumferential direction in a separate casing.

In these prior arts, however, do not show that the valve body moves across two separate casing.

Therefore, the valve body can not open and close the whole branch hole when a size of the branch hole is large.

In view of the foregoing, an object of the invention is to provide a branching unit for drilling without stopping of fluid which is at low cost, has a short drill stroke, and is capable of constructing in a shallow earth covering.

To achieve the object, in this invention, a branching unit for boring without stopping passage of fluid, which is suitable for forming an opening at a pipe wall by boring a part of the pipe wall of an existing pipe using a drill machine having a hole saw to connect a branch pipe to the existing pipe, comprises: a sealing case including a first separate casing and a second separate casing separated in a circumferential direction of the existing pipe as well as surrounding a part of the existing pipe, the first separate casing formed integrally with a branch pipe portion projecting and branching off in a radial direction of the existing pipe; a valve body having an arc shape part in cross section which opens and closes a branch hole of the branch pipe portion by rotating along the circumferential direction of the existing pipe between an inner circumferential surface of the sealing case and an outer circumferential surface of the existing pipe; a valve seat formed at the inner circumferential surface in the first separate casing, the valve body touching the valve seat in a valve closing state; and a rotation mechanism for rotating the valve body, wherein a first space is provided between the first separate casing and the existing pipe, accommodating the arc shape part of the valve body, which is movable in the first space, a second space is provided between the second separate casing and the existing pipe, accommodating the arc shape part of the valve body, which is movable in the second space, the first space and the second space are connected with each other in the circumferential direction, and the arc shape part of the valve body mostly accommodated in the second space in a valve opening state is rotated with the rotation mechanism, blocking the branch hole.

The "most (mostly)" means that at least over half of the valve body is accommodated in the second space in the valve opening state, wherein over 60% of the valve body accommodated in the second space is preferable, over 70% of the valve body accommodated in the second space is most preferable.

In this invention, the arc shape part of the valve body in cross section rotating between the sealing case and the existing pipe along the existing pipe, a part accommodating a valve body such as a valve casing or an opercular valve does not need to be provided separately. Therefore, the unit can be low-cost and downsized.

A bending strength of the arc shaped valve body being greater than that of a tabular shaped valve body, the valve body can be thin.

A part accommodating the valve body not needing to be provided, a stroke for drill can be shortened.

The valve body not moving up and down but rotating along a circumferential surface of the existing pipe, the height of the valve body can be low. Therefore, drill construction can be done in a shallow earth covering.

In preferred embodiment of this invention, the valve body has an arc shape in cross section, which can reciprocate along the circumferential direction of the existing pipe between a valve closing position in which the opening is covered as well as the branch hole is closed and a valve opening position in which the opening is uncovered and the opening and the branch hole are connected, and wherein the valve body and the valve seat are formed so that a distance between the valve body and the valve seat in the radial direction of the existing pipe becomes small as the valve body moves rotationally from the valve opening position to the valve closing position.

In this embodiment, the valve seat has a contact surface touching the valve body, which is formed so that a curvature radius at the contact surface becomes small continuously as well as gradually as the valve body comes close from the valve opening position to the valve closing position.

The arc shape part of the valve body rotating across from the second space to the first space along the circumferential direction and blocking the branch hole, the valve body can open and close the branch hole in that a diameter of the branch hole is nearly equal to a caliber of the existing pipe. So-called "drill construction for the same diameter of pipe" can be done.

In this embodiment, the valve body is closely pressed against the valve seat as the valve body proceeds in the valve closing direction. Therefore, watertight function can be improved in the valve closing state.

In an another preferred embodiment of this invention, the branching unit has a pressing portion pressing the valve body outward in the radial direction so that the valve body is pressed against the valve seat as the valve body further proceeds in the valve closing direction in the valve closing position.

The valve body being compressed against the valve seat, the water tight function can be improved in the valve closing state.

In a further another preferred embodiment of this invention, the valve body comprises a concave surface which is curved along the outer circumferential surface of the existing pipe and a convex surface facing the branch hole in the valve closing position, wherein the rotation mechanism comprises an operation gear rotationally operated from an outside of the sealing case and a driven gear formed at the convex surface of the valve body, wherein the driven gear is meshed with the operation gear, being rotated by the rotation of the operation gear in the circumferential direction, the valve body being reciprocated to open and close the branch hole, and a contact surface touching the valve seat in the convex surface more protrudes than the surface of the driven gear in the radial direction of the existing pipe.

In this embodiment, the contact surface of the valve body more protruding than the surface of the driven gear in the radial direction of the existing pipe, teeth of the driven gear do not decline the watertight function.

In this invention, it is preferred that the rotation mechanism comprises an operation gear rotationally operated from the outside of the sealing case and a driven gear meshed with the operation gear, and wherein the driven gear is rotated by the rotation of the operation gear in the circumferential direction, the valve body being reciprocated to open and close the branch hole.

In this case, an opening and closing operation can be done by rotating the valve body in the circumferential direction of the existing pipe by operating the operation gear from outside of the sealing case.

In the invention, it is preferred that the sealing case consists of two separate casings of the plural separate casings and the two separate casings are connected at connection portions at an inclined surface which inclines to a virtual flat surface orthogonal to an axis of the branch pipe portion, the two separate casings being connected at the inclined surface, a distance between the branch pipe portion and the connection portions in the first separate casing is larger at an upper portion than at a lower portion, and the operation gear is arranged at the upper portion.

Inclining the connection portions results in a space in which the operation gear is provided. To provide the operation gear in the space, the valve body can be shortened in the circumferential direction. Therefore, the valve body can be downsized.

In the invention, the operation gear may be provided at the second separate casing including no the branch pipe portion.

In this case, the first separate casing not needing to be provided with the operation gear, a drill for large bore diameter can be done.

In the preferred embodiment of the invention, a guide portion guiding the rotation of the valve body being provided at the sealing case, a guided groove guided by the guide portion being provided at both ends of the valve body in an axial direction of the existing pipe, and portions of the valve body forming the guided groove protruding so as to come close to the sealing case, thereby a pair of ribbed reinforcing portions extending in a circumferential direction along the guided groove is formed integrally with the valve body.

Providing the guide portion results in a stability of the rotation of the valve body. Deformation of the valve body being suppressed by providing the pair of the ribbed reinforcing portions, the sealing function can be improved.

In the invention, the operation gear may comprise a worm whose axis is set approximately in the radial direction of the existing pipe and a worm wheel whose axis is set in parallel to an axial direction of the existing pipe. The driven gear may be formed at the valve body and meshed with the worm wheel.

In this case, the valve body can be prevented from rotating caused by its weight in the circumferential direction. Axle ratio being great, the valve body can be operated by small control force during opening and closing the valve.

In the invention, it is preferred that an endless rubber ring for sealing is mounted along around the branch hole of the branch pipe portion in the first separate casing including the branch pipe portion.

The valve body being pressed against the rubber ring in the valve closing state, sealing can be done.

BRIEF DESCRIPTION OF THE DRAWINGS

FIG. 2A and FIG. 2B are schematic sectional views each showing a method for boring without stopping passage of fluid.

FIG. 9 is a schematic sectional view showing a valve body of the third embodiment.

FIG. 13A is a side sectional view, FIG. 13B is a front view, and FIG. 13C is a bottom sectional view, which each shows a developed valve body of a fifth embodiment, and FIG. 13D is a partial sectional plan view showing a branching unit of the fifth embodiment.

FIG. 17A is a side sectional view, FIG. 17B is a front view, and FIG. 17C is a bottom sectional view, which each shows a developed valve body of a sixth embodiment, and FIG. 17D is a front view showing the branching unit of the sixth embodiment.

DESCRIPTION OF REFERENCE NUMERALS

Figure 1A:
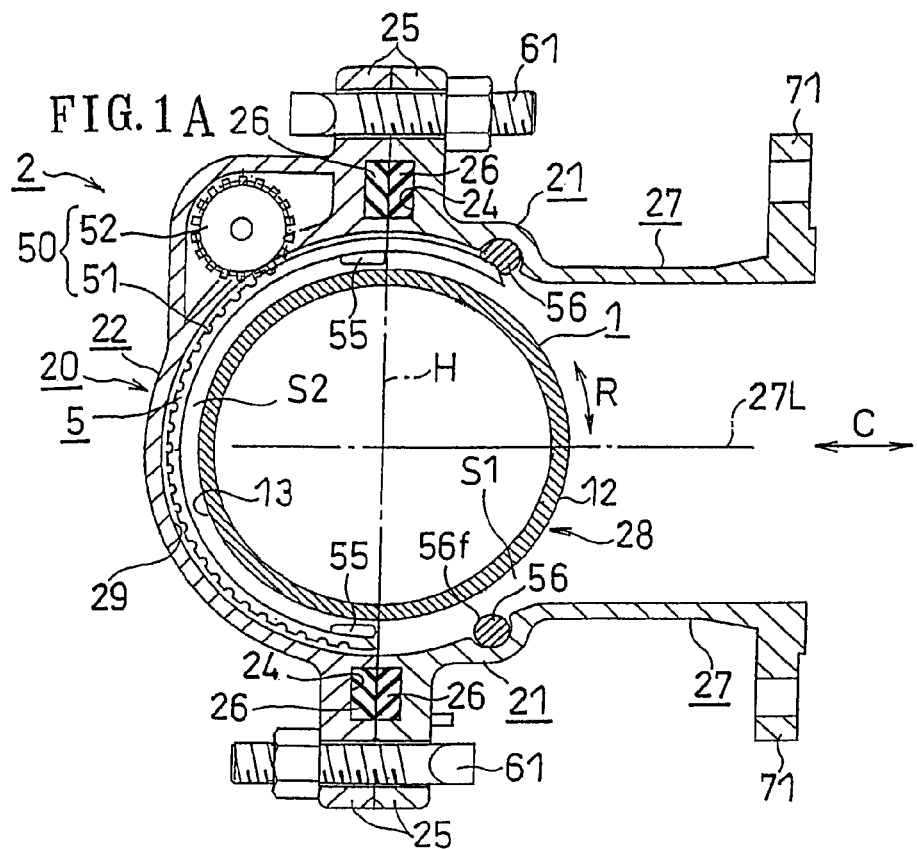
FIG. 1A is a schematic sectional view showing a branching unit of a first embodiment.

1: existing pipe
2, 2A, 2B, 2C: branching unit
3: drill machine
4: hole saw
5: valve body
5f: first contact surface
11: opening
12: pipe wall
13: outer circumferential surface of an existing pipe
20: sealing case
21: first separate casing
22: second separate casing
25: connecting portion
27: branch pipe portion
27L: axis line of a branch pipe portion
28: branch hole
29: inner circumferential surface of a separate casing
50: rotation mechanism
51: driven gear
52: operation gear
53: guide portion
56: valve seat
56f: second contact surface
C: radial direction of the existing pipe 1
H: virtual flat surface
R: circumferential direction of the existing pipe 1
S1: first space
S2: second space
Sf: inclined surface

DESCRIPTION OF THE PREFERRED EMBODIMENTS

The present invention will be understood more apparently from the following description of preferred embodiment when taken in conjunction with the accompanying drawings. However, it will be appreciated that the embodiments and the drawings are given for the purpose of mere illustration and explanation and should not be utilized to define the scope of the present invention. The scope of the present invention is to be defined only by the appended claims. In the drawings annexed, the same reference numerals denote the same or corresponding parts throughout several views.

Embodiments of the present invention will now be described with reference to the drawings.

First Embodiment:

FIG. 1A to FIG. 5B each shows the first embodiment.

Figure 3A:
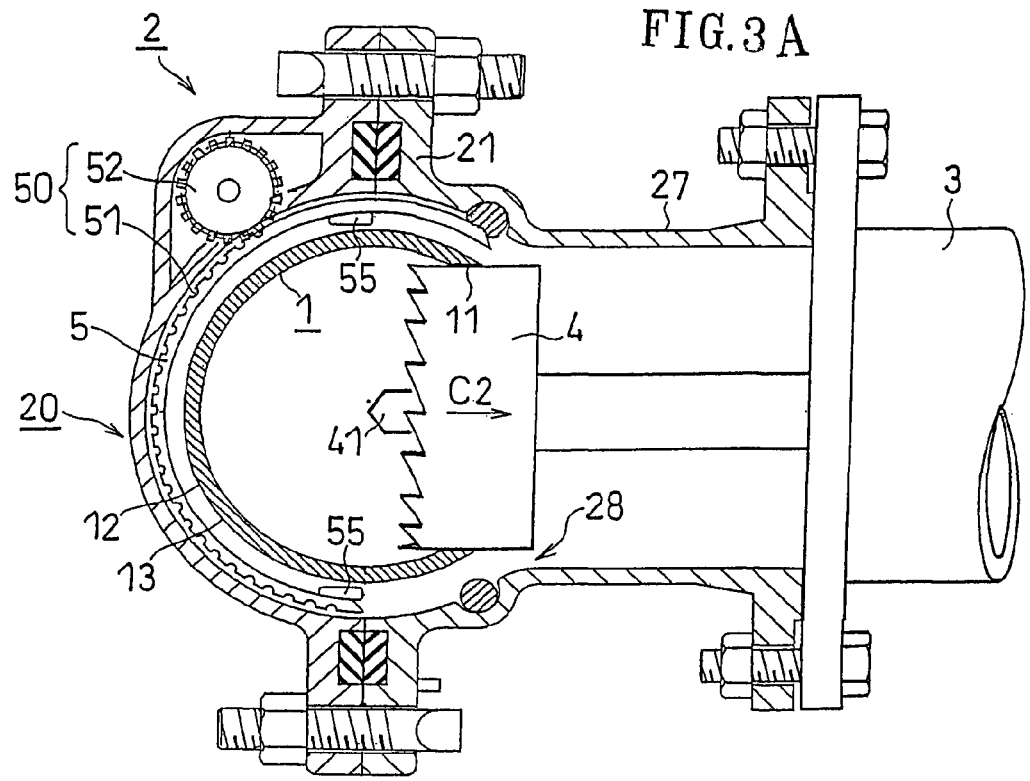
FIG. 3A and FIG. 3B are schematic sectional views each showing a method for boring without stopping passage of fluid.

Branching Unit 2:

The branching unit 2 of FIG. 1A, as shown in FIG. 3A, is used in boring without stopping passage of fluid in which a drill machine 3 having a hole saw 4 drills a part of pipe wall 12 of an existing pipe 1 with fluid (e.g. water) flowing in the pipe and a branch is extracted from the existing pipe 1.

As shown in FIG. 1A, the branching unit 2 has a sealing case 20 surrounding the existing pipe 1. The sealing case 20 comprises a first separate casing 21 and a second separate casing 22 separated in a circumferential direction R of the existing pipe 1, and a branch pipe portion 27, integrally being formed with the first separate casing 21, projecting and branching off in a radial direction C of the existing pipe 1.

Separate Casings 21, 22:

The first and second separate casings 21, 22 are separated along a virtual flat surface H substantially orthogonal to an axis line 27L of the branch pipe portion 27. The separate casings 21, 22 being fitted to an exterior of the existing pipe 1 from both sides of the radial direction C of the existing pipe 1, assembling bolts 61 clench a connecting portion 25.

The separate casings 21, 22 comprise an inner circumferential surface 29 substantially curved along an outer circumferential surface 13 of the existing pipe 1. A groove shaped packing applied portion 24 is formed at the connecting portion 25 of the separate casings 21, 22 and both end portions of the existing pipe 1 in a tube axis direction. A rubber packing 26 being mounted at the packing applied portion 24, a space between the existing pipe 1 and the branching unit 2 and between the first separate casing 21 and the second separate casing 22 are sealed.

Figure 11A:
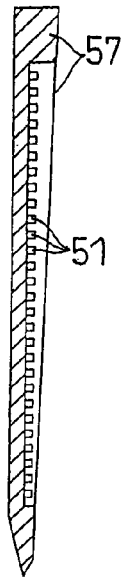
FIG. 11A is a side sectional view.
Figure 11B:
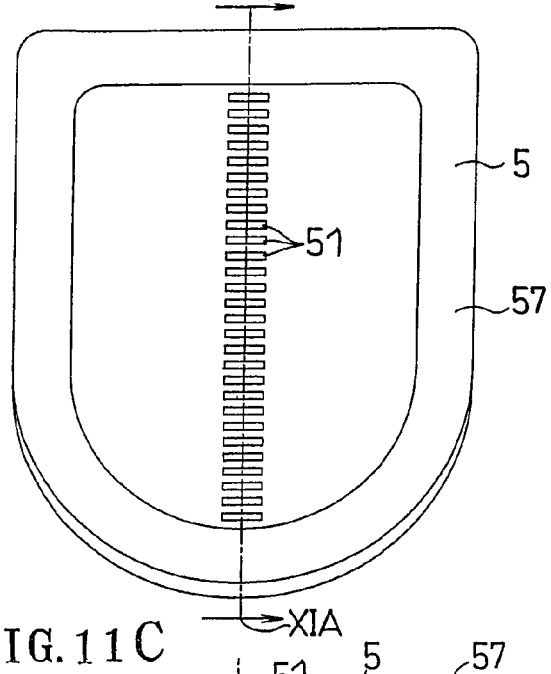
FIG. 11B is a front view.
Figure 11C:
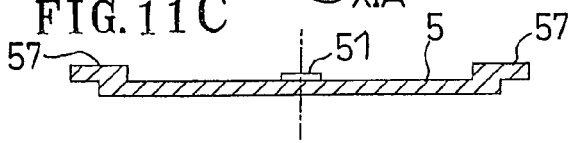
FIG. 11C is a bottom sectional view, which each shows a developed valve body of the forth embodiment.
Figure 11D:
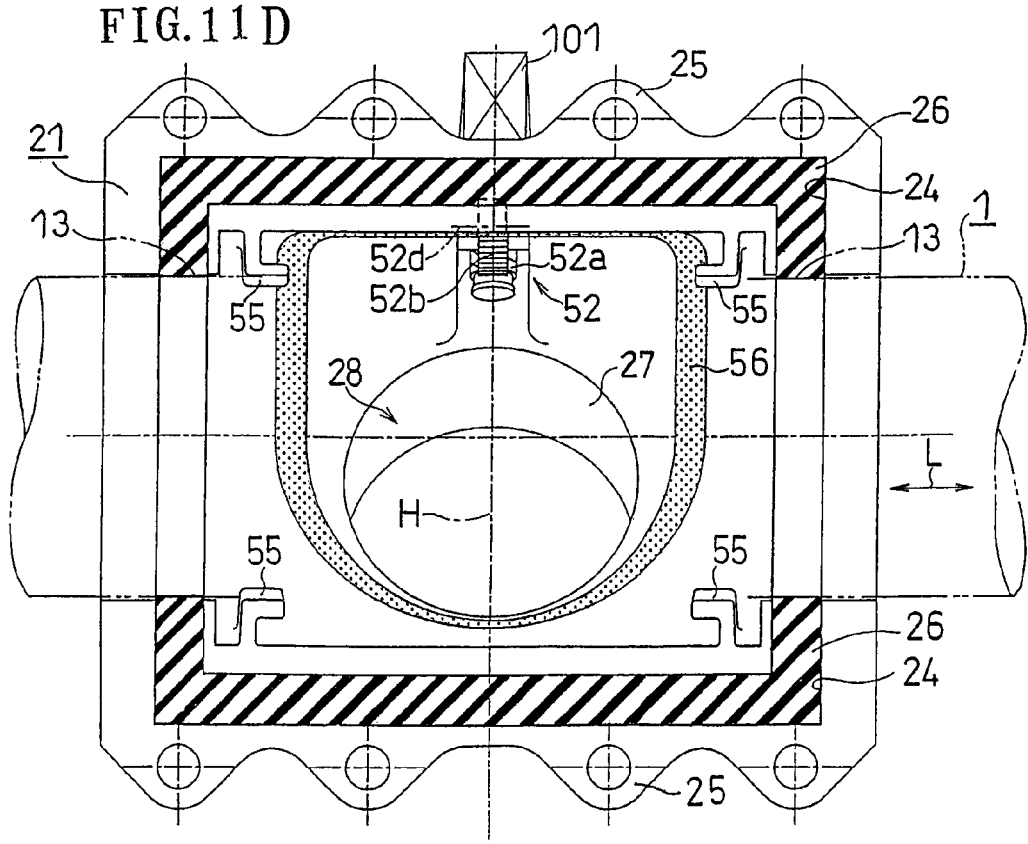
FIG. 11D is a schematic back view showing a first separate casing.

In constructing the branching unit 2, both ends of the separate casings 21, 22 in the tube axis direction of the existing pipe 1 are sealed at the outer circumferential surface 13 of the existing pipe 1 using the rubber packing (see FIG. 11D).

Figure 3B:
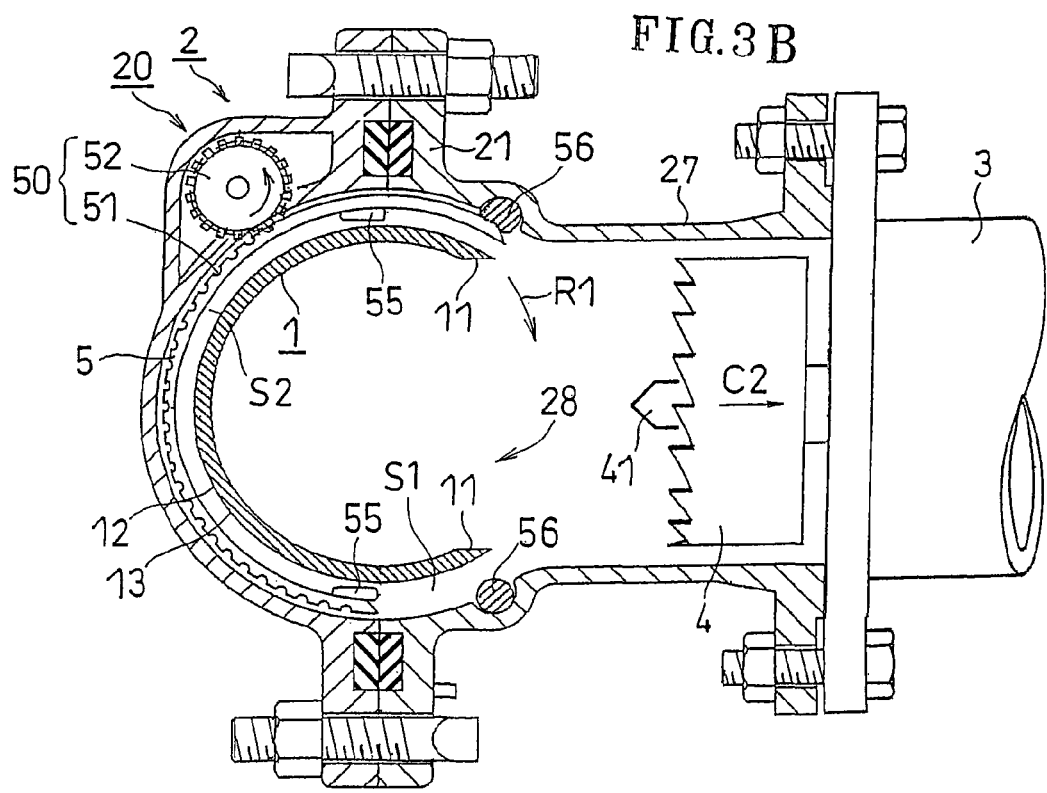

Branching Pipe Portion 27:

As shown in FIG. 2A, a part of the drill machine 3 is installed to a joint portion 71 (like a flange) of the branch pipe portion 27. A hole saw 4 going toward the existing pipe 1 in the radial direction C through a branch hole 28 of the branch pipe portion 27, as shown in FIG. 3A, a pipe wall 12 of the existing pipe 1 is cut. Therefore, an opening 11 is formed in the existing pipe 1 as shown in FIG. 3B. A center drill 41 positioning the hole saw 4 is provided at a rotating center of the hole saw 4. The center drill 41 protrudes toward the existing pipe 1.

Valve Body 5:

As shown in FIG. 1A, a first space S1 is provided between the existing pipe 1 and the first separate casing 21, a second space S2 between the existing pipe 1 and the second separate casing 22. The first and second spaces S1, S2 are connected with each other in the circumferential direction R, accommodate an arc shaped valve body 5 in cross section which can rotate freely in the first and second spaces S1, S2. Rotating along between the inner circumferential surface 29 of the separate casings 21, 22 and the outer circumferential surface 13 of the existing pipe 1 in the circumferential direction R of the existing pipe 1, the valve body 5 opens and closes the branch hole 28 of the branch pipe portion 27.

In a valve opening state of FIG. 1A and boring of FIG. 3A, most of the valve body 5 is accommodated in the second space S2. A rotation mechanism 50 rotates the valve body 5 in the circumferential direction R, most of the valve body 5 is accommodated in the first space S1 in a valve closing state of FIG. 4A and FIG. 4B, whereby the valve body 5 blocks the branch hole 28.

The separate casings 21, 22 are integrally provided with guide portion 55 guiding the rotation of the arc shaped valve body 5 (see FIG. 11D).

Figure 1B:
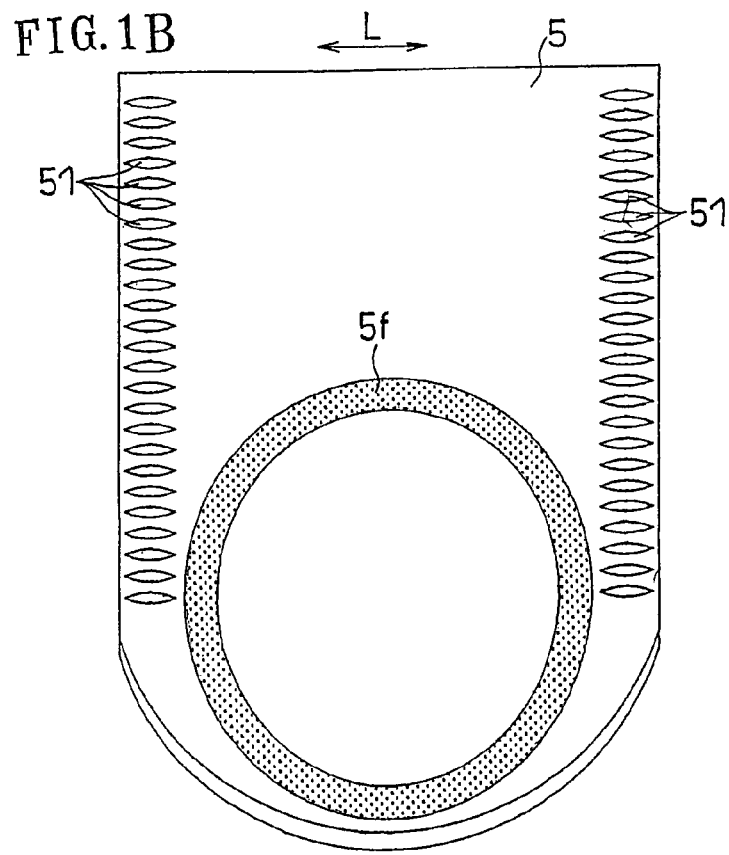
FIG. 1B is a development view showing a valve body.

FIG. 1B is a development view of the valve body 5 of FIG. 1A. In FIG. 1B, the valve body 5 is shown as a flat plate before bending to an arc shape.

As shown in FIG. 1B, a driven gear 51 is provided at both ends of the valve body 5 in a tube axis direction L. As shown in FIG. 1A, an operation gear 52 operated from the outside of a sealing case 20 is provided at an upper portion of the second separate casing 22. The driven gear 51 meshes the operation gear 52. The driven gear 51 being rotated by the rotation of the operation gear 52 in the circumferential direction R, the valve body 5 is rotated. The operator rotating the operation gear 52 to rotate the valve body 5 along the circumferential direction R of the existing pipe 1, the valve body 5 reciprocates between a valve opening position of FIG. 1A and valve closing position of FIG. 4A.

The driven gear 51 and operation gear 52 consist of a rotation mechanism 50 rotating the valve body 5.

The first separate casing 21 having the branch pipe portion 27 mounts a circumferential rubber ring 56 (an example of valve seat) for sealing which is along around the branch hole 28 of the branch pipe portion 27.

Figure 4A:
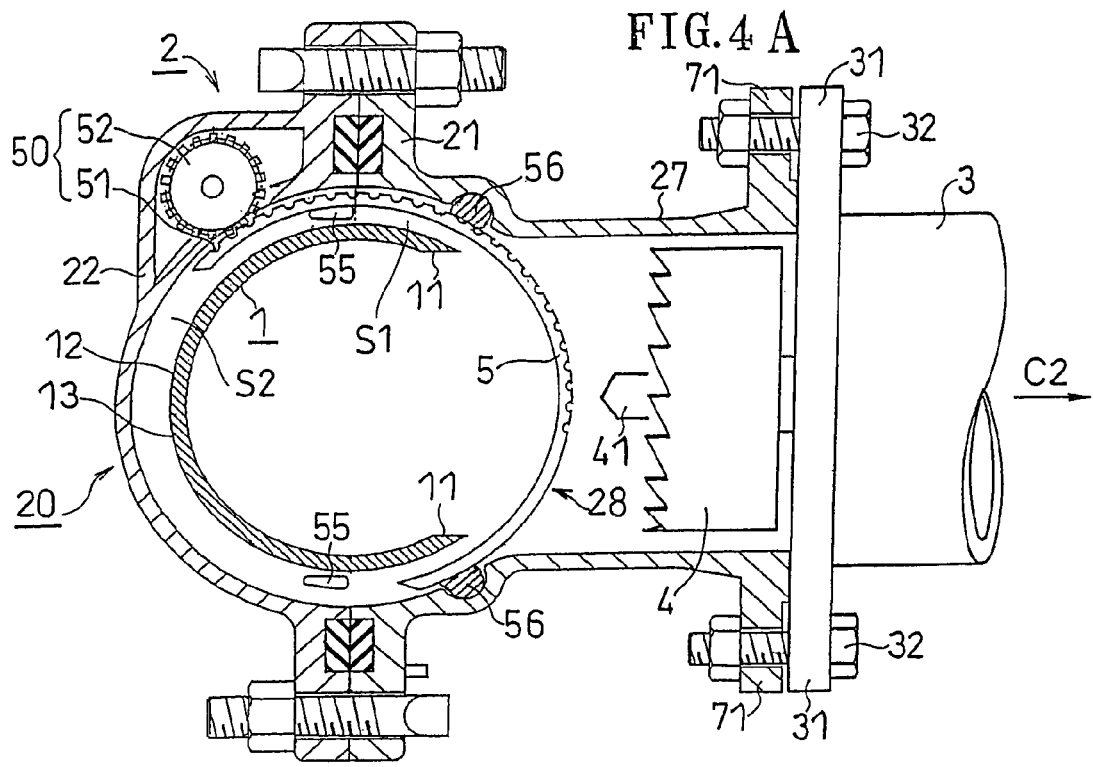
FIG. 4A and FIG. 4B are schematic sectional views each showing a method for boring without stopping passage of fluid.

The valve body 5 rotating toward the valve closing position of FIG. 4A, a first contact surface 5*f* of the valve body 5 which is dot mesh shown in FIG. 1B is in close contact with a second contact surface 56*f* of the rubber ring 56. As shown in FIG. 4A, the branch hole 28 being blocked, the separate casings 21, 22 and the valve body 5 seal a circumferential of an opening of the existing pipe 1.

Method for Boring without Stopping Passage of Fluid:

The branching unit 2 is fixed so as to surround the outer circumferential surface 13 of the existing pipe 1, with fluid passing through the existing pipe 1 of FIG. 1A. An operator assembles the separate casings 21, 22 using the assembling bolts 61. The valve body 5 is preliminary provided in the valve closing position blocking the branch hole 28 of the branch pipe portion 27.

As shown in FIG. 2A, opening the valve, the operator installs a flange portion 31 of the drill machine 3 to a flange portion 71 of the branch pipe portion 27. The branching unit 2 surrounds a part of the existing pipe 1 in an airtight.

The hole saw 4 which is rotating moves toward the existing pipe 1 in a boring direction C1. As shown in FIG. 2B, the center drill 41 cuts a part of the pipe wall 12 of the existing pipe 1, and the hole saw 4 rotating around the center drill 41 is positioned to the existing pipe 1. As shown in FIG. 3A, cutting a part of the pipe wall 12 of the existing pipe 1 with the hole saw 4 results in the opening 11.

As shown in FIG. 3B, the hole saw 4 is moved in a backdown direction C2 after the center drill 41 and the hole saw 4 bore the existing pipe 1.

The operator rotating the operation gear 52, the valve body 5 is guided to a guide portion 55 by the driven gear 51 meshed with the operation gear 52. Rotated in a valve closing direction R1 of the branch hole 28, the valve body 5 moves from the valve opening position to the valve closing position of FIG. 4A. Rotating to the valve closing position, the valve body 5 is in close contact with a surface of the rubber ring 56. Therefore, the branch hole 28 being blocked, the separate casings 21, 22 and the valve body 5 surrounds the existing pipe 1 in an airtight.

Figure 4B:
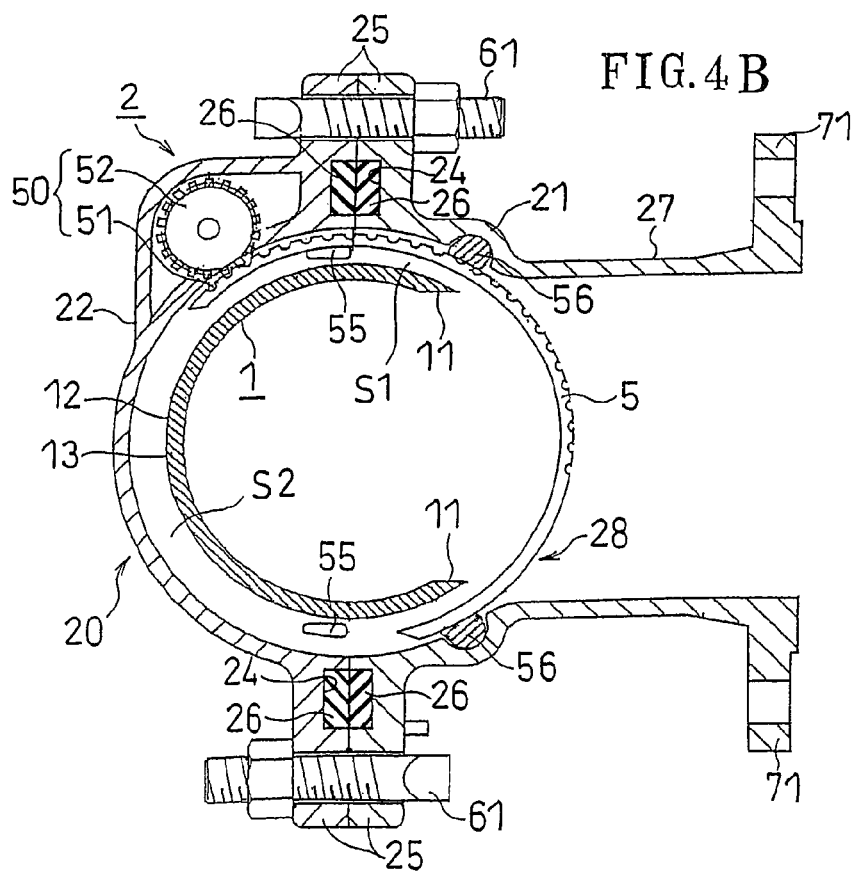

Bolts 32 are removed, the drill machine 3 is moved in the backdown direction C2, the hole saw 4 is removed from the branching unit 2 as shown in FIG. 4B.

Figure 5A:
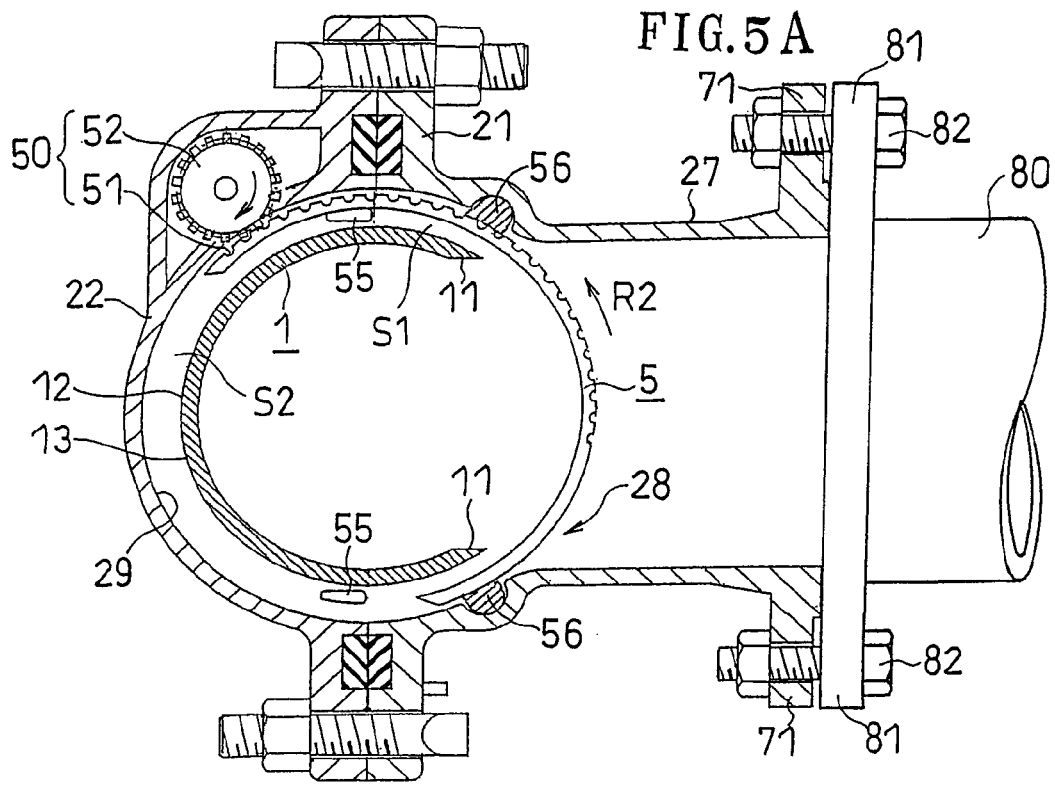
FIG. 5A and FIG. 5B are schematic sectional views each showing a method for boring without stopping passage of fluid.
Figure 5B:
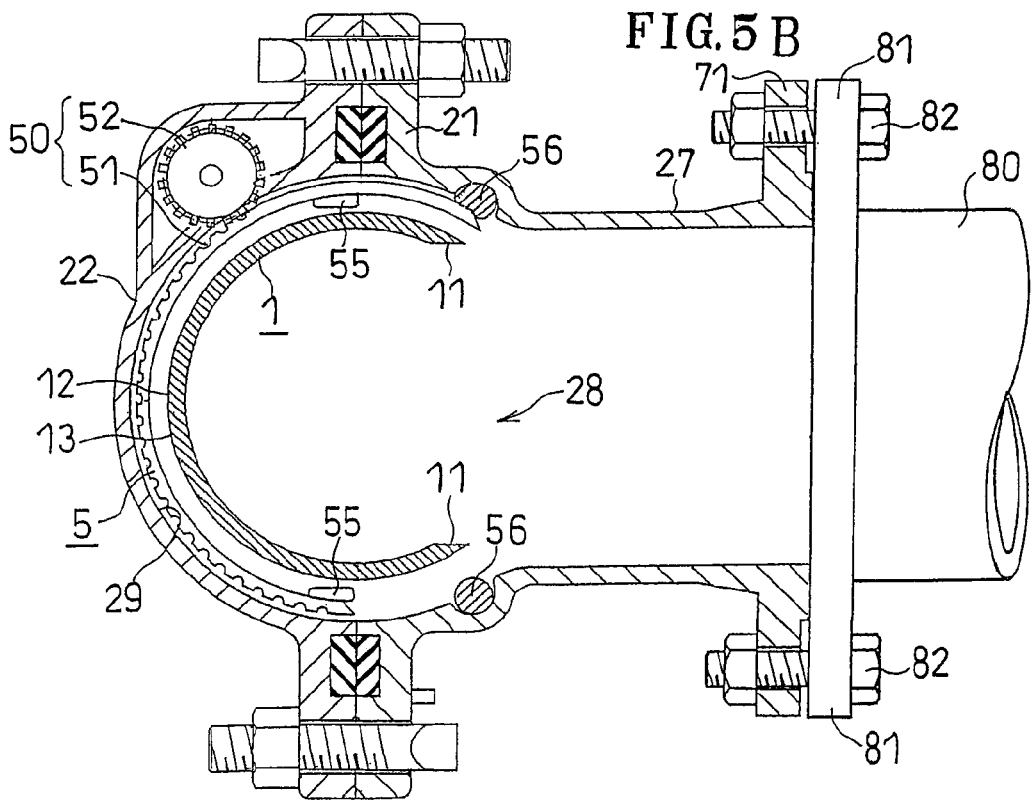

As shown in FIG. 5A, a branch pipe 80 is mounted at the branch pipe portion 27 after removing the drill machine 3. A flange portion 81 of the branch pipe 80 is connected to the flange portion 71 of the branch pipe portion 27 with bolts 82.

The operator rotating the operation gear 52, the valve body 5 rotates to the valve opening position in a valve opening direction R2. Thereby, the drill construction in which a branch heading to the branch pipe 80 is connected to the existing pipe 1 is completed.

The separate casings may be separated into more three parts.

A separate casing may be assembled by welding between connecting portions.

The valve body may be circular. In this case, a hole corresponding to the branch hole 28 is formed in the valve body.

Figure 6A:
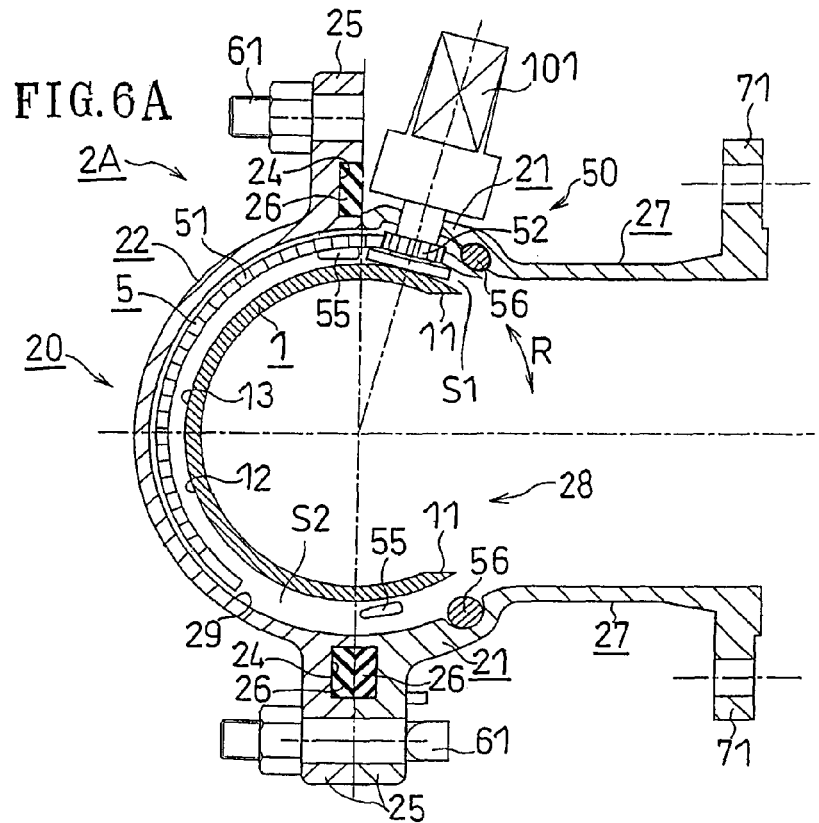
FIG. 6A and FIG. 6B are schematic sectional views each showing a branching unit of a second embodiment.
Figure 6B:
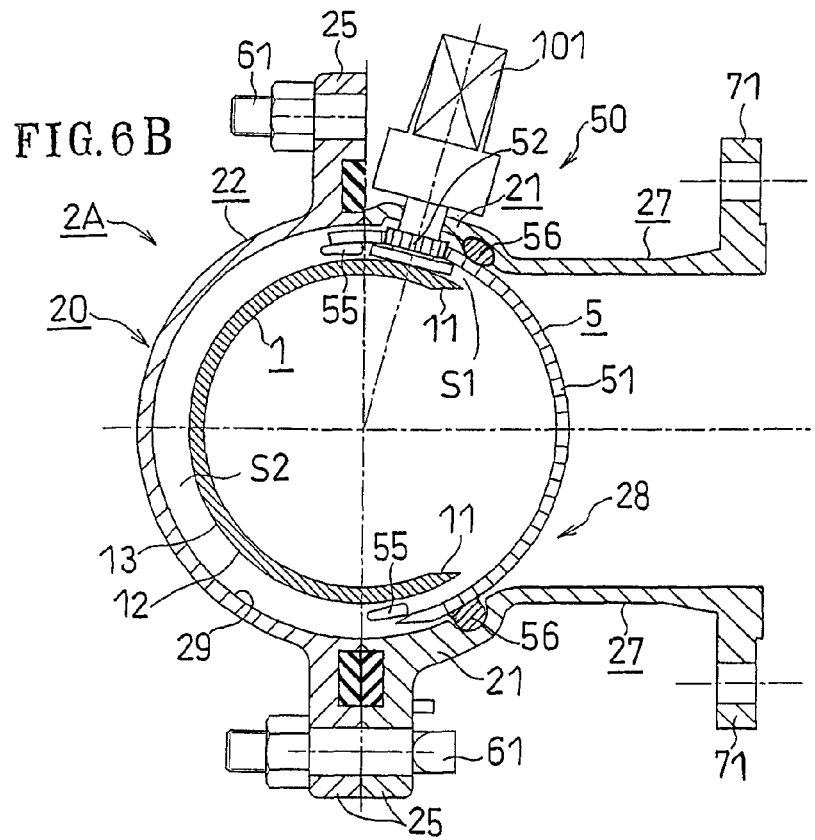
Figure 7:
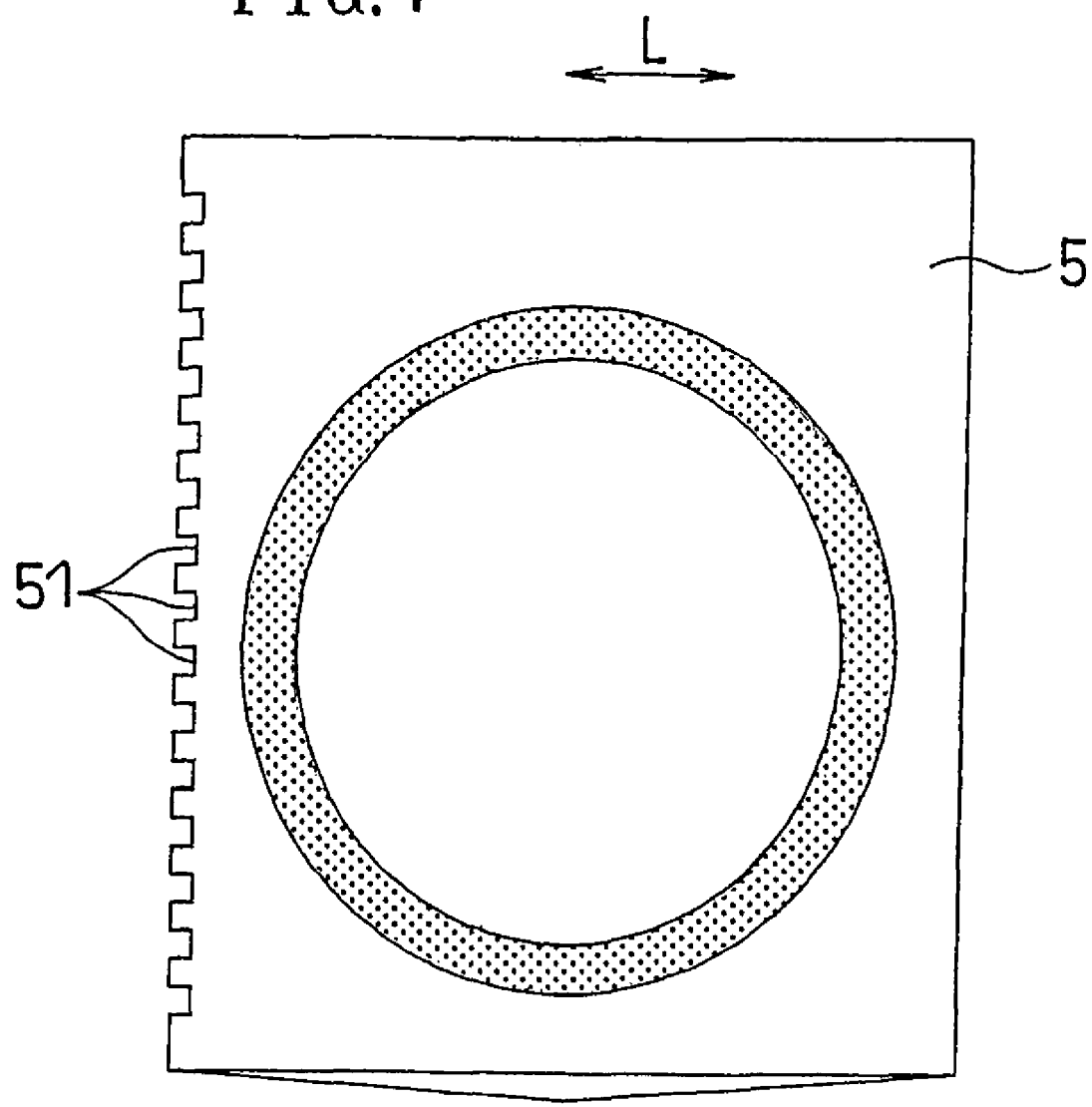
FIG. 7 is a schematic development view showing a valve body of the second embodiment.

Second Embodiment:

FIG. 6A to FIG. 7 each shows a second embodiment.

As shown in FIG. 6A and FIG. 6B, an upper portion of the first separate casing 21 is provided with the operation gear 52 of a branching unit 2A. As shown in FIG. 7, the driven gear 51 is provided on only one side of the valve body 5.

Other composition of the branching unit in the second embodiment is similar to that of the first embodiment, the parts which are identical or corresponding to those of the first embodiment are designated by the same reference numerals as the first embodiment and the detailed description thereof will be omitted.

Figure 8A:
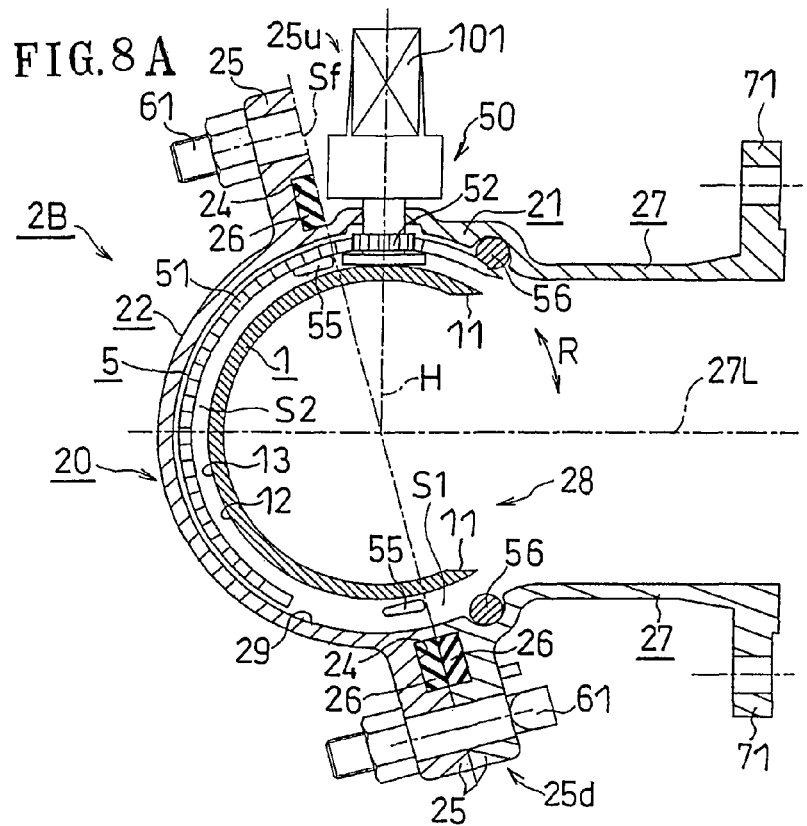
FIG. 8A and FIG. 8B are schematic sectional views each showing a branching unit of a third embodiment.

Third Embodiment:

FIG. 8A to FIG. 9 each shows a third embodiment.

Figure 8B:
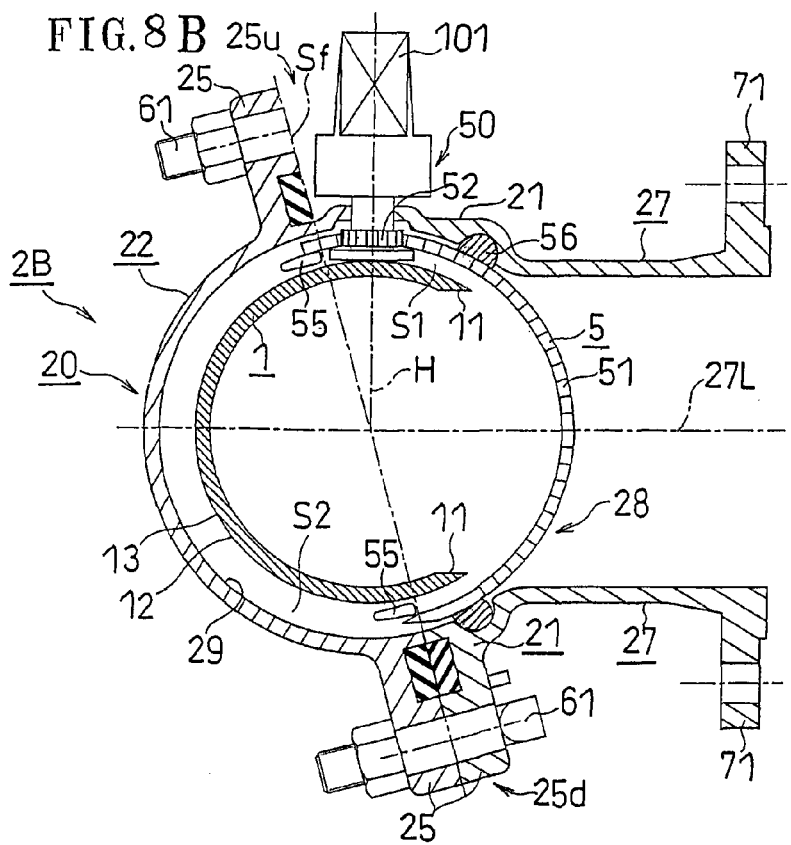

As shown in FIG. 8A and FIG. 8B, in a branching unit 2B, an upper portion 25*u* of the first separate casing 21 is provided with the operation gear 52 and an operation cap 101 in vicinal of the virtual flat surface H substantially orthogonal to the axis line 27L of the branch pipe portion 27. Therefore, the separate casings 21, 22 are separated in an inclined surface Sf inclining to the virtual flat surface H orthogonal to the axis line 27L of the branch pipe portion 27.

The sealing case 20 being separated in the inclined surface Sf, a distance between the branch pipe portion 27 and the connection portion 25 in the first separate casing 21 is larger at an upper portion 25*u* than at a lower portion 25*d*. The upper portion 25*u* broaden is provided with the operation gear 52 and the operation cap 101.

An incline of the inclined surface Sf may be in reversed position from the incline of the FIG. 8A and FIG. 8B. That is, the connection portion 25 in the first separate casing 21 is larger at the lower portion 25*d* than at the upper portion 25*u*. In this case, the rotation mechanism 50 is provided at the upper portion 25*u* of the second separate casing 22.

As shown in FIG. 9, the driven gear is provided on only one side of the valve body 5.

Other composition of the branching unit in the third embodiment is similar to that of the first embodiment, the parts which are identical or corresponding to those of the first embodiment are designated by the same reference numerals as the first embodiment and the detailed description thereof will be omitted.

Fourth Embodiment:

FIG. 10A to FIG. 12B each shows a fourth embodiment.

Figure 10A:
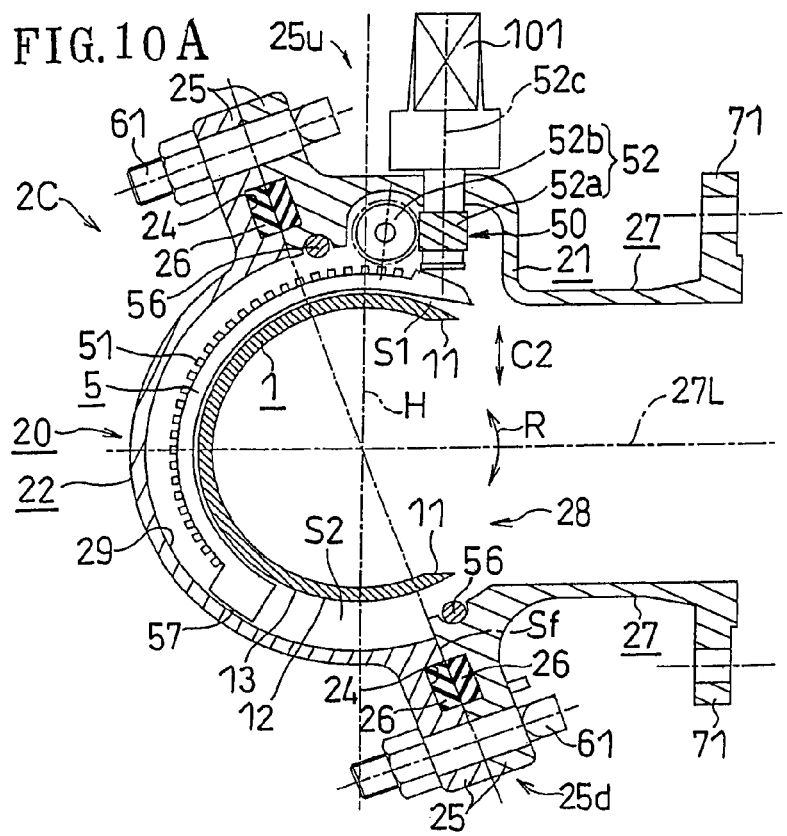
FIG. 10A and FIG. 10B are schematic sectional views each showing a branching unit of a forth embodiment.
Figure 10B:
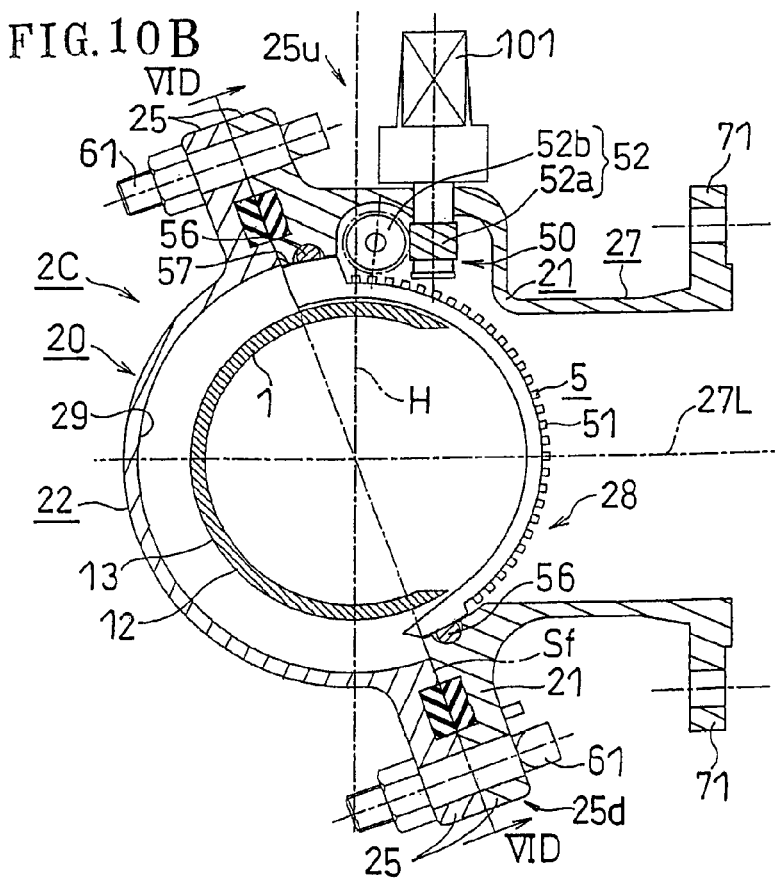

As shown in FIG. 10A and FIG. 10B, being similar to the third embodiment, in a branching unit 2C of the fourth embodiment, the upper portion 25u of the first separate casing 21 is provided with the operation gear 52 and the operation cap 101, and the separate casings 21, 22 are separated in the inclined surface Sf inclining to the virtual flat surface H orthogonal to the axis line 27 of the branch pipe portion 27.

As shown in FIG. 10A, the operation gear 52 comprises so-called Hindley (hand drum) worm gears which consists of a worm 52a and a worm wheel 52b. An axis line 52c of the worm 52a is set substantially parallel to the radial direction C2 of the existing pipe 1. As shown in FIG. 11D, an axis line 52d of the worm wheel 52b is set parallel to the tube axis direction L of the existing pipe 1.

As shown in FIG. 10A and FIG. 10B, the driven gear 51 meshes with the worm wheel 52b.

As shown in FIG. 11B, the driven gear 51 is provided at about center of the valve body 5. As shown in FIG. 11A to FIG. 11C, a coherent portion 57 being close contact with the rubber ring 56 (FIG. 11D) in the valve closing position shown in FIG. 12B is formed at around the valve body 5.

Figures 12A, 12B:
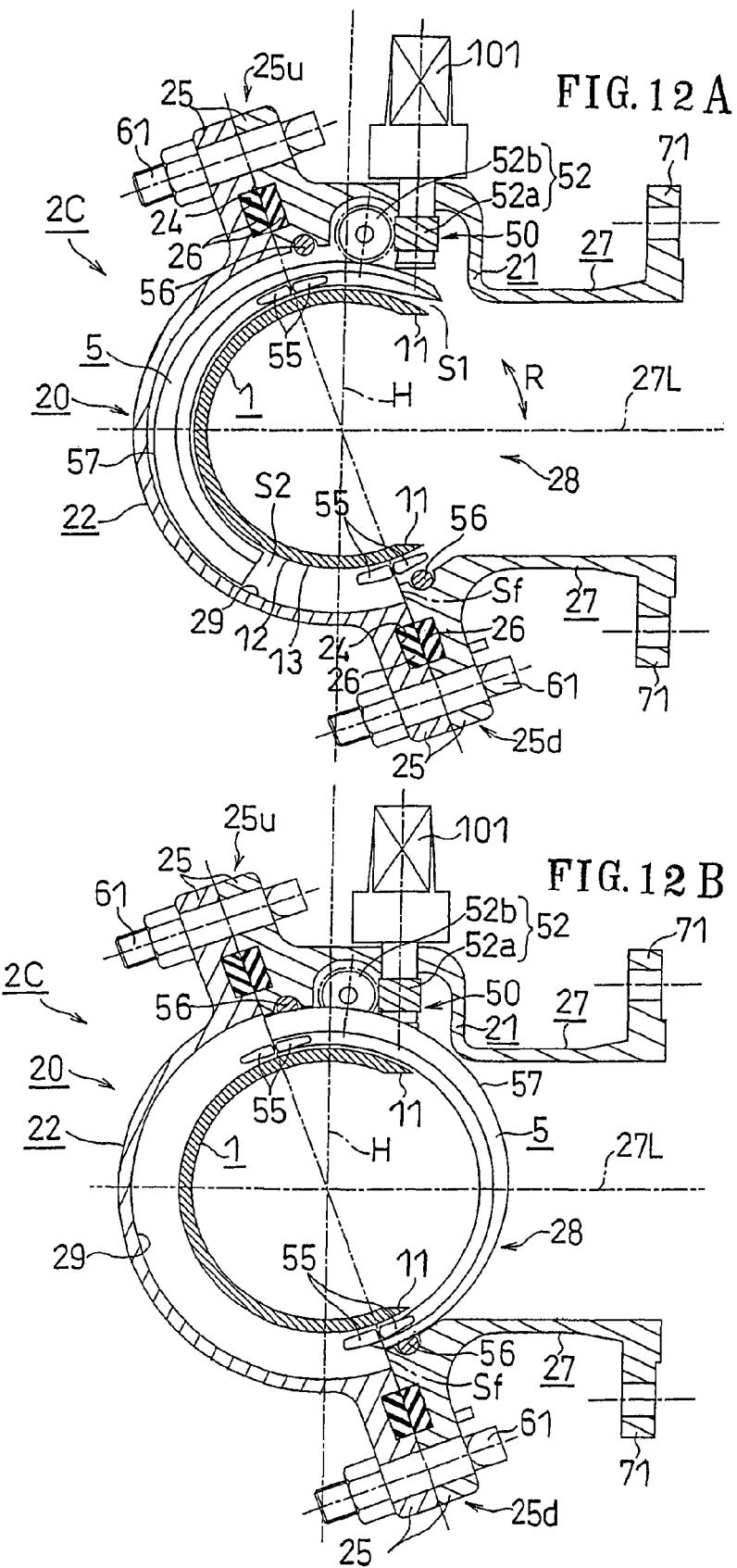
FIG. 12A and FIG. 12B is a schematic sectional view of the branching unit of the forth embodiment.

The operator rotating the operating cap 101, the valve body 5 is rotated from the valve opening position of FIG. 12A to the valve closing position of FIG. 12B. The coherent portion 57 of FIG. 11B being closely contacted with the rubber ring 56 of FIG. 11D, the sealing case of FIG. 10B is sealed.

The operation gear 52 consisting of the worm 52a and worm wheel 52b, an axle ratio becomes great. Therefore, although large water pressure applies to the inside of the sealing case 20, the valve can be opened by small control force in opening the valve.

As shown in FIG. 11D, the rubber packing 26 is in close contact with the outer circumferential surface 13 of the existing pipe 1 shown in two-dot chain line at both end portions of the separate casing 21 (22) in the tube axis direction L.

Other composition of the branching unit in the fourth embodiment is similar to that of the first embodiment, the parts which are identical or corresponding to those of the first embodiment are designated by the same reference numerals as the first embodiment and the detailed description thereof will be omitted.

Fifth Embodiment:

FIG. 13A to FIG. 14B each shows a fifth embodiment.

Figure 14A:
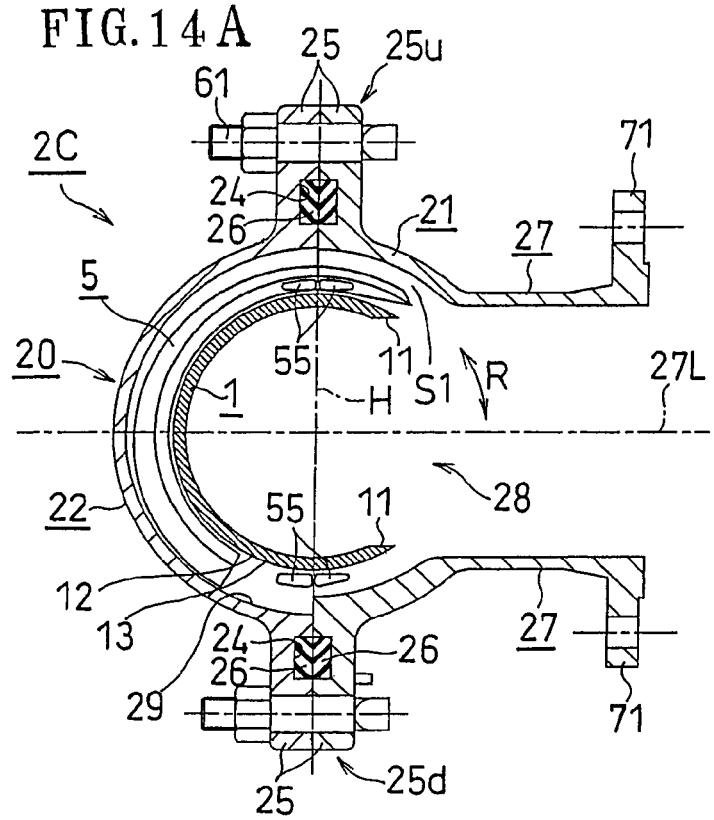
FIG. 14A and FIG. 14B are transverse sectional views each showing the branching unit of the fifth embodiment.
Figure 14B:
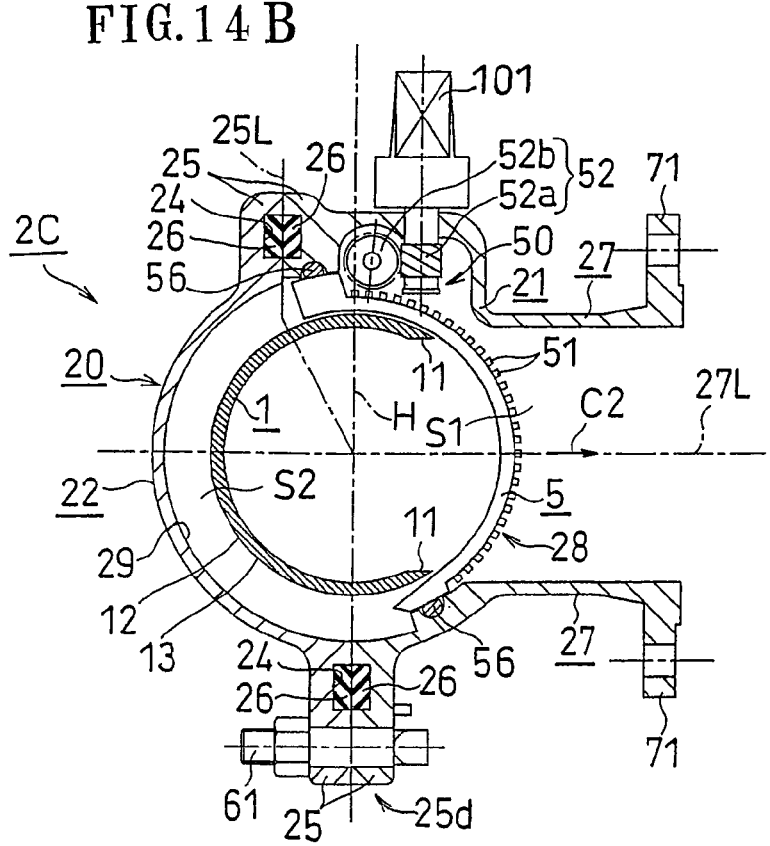

In the valve body 5 of FIG. 13B, a first contact surface 5f shown in dot mesh contacts with the rubber ring 56 in the valve closing state of FIG. 14B. The first contact surface 5f is endlessly provided to surround the driven gear 51 from the driven gear's environment.

As shown in FIG. 13A and FIG. 14B, the first contact surface 5f more protrudes than the surface of the driven gear 51 in outward radial direction C2 of the existing pipe 1. As shown in FIG. 13B, a base portion 5/1 in the first contact surface 5f comes close to the driven gear 51. Other portion 5/2 in the first contact surface 5f is formed as C-shaped.

As shown in FIG. 13D, FIG. 14A, and FIG. 14B, a separate line 25 bends in center of the upper portion. Therefore, the rotation mechanism can be accommodated to the first separate casing 21.

Sixth Embodiment:

FIG. 15A to FIG. 17D each shows a sixth embodiment.

Figure 15A:
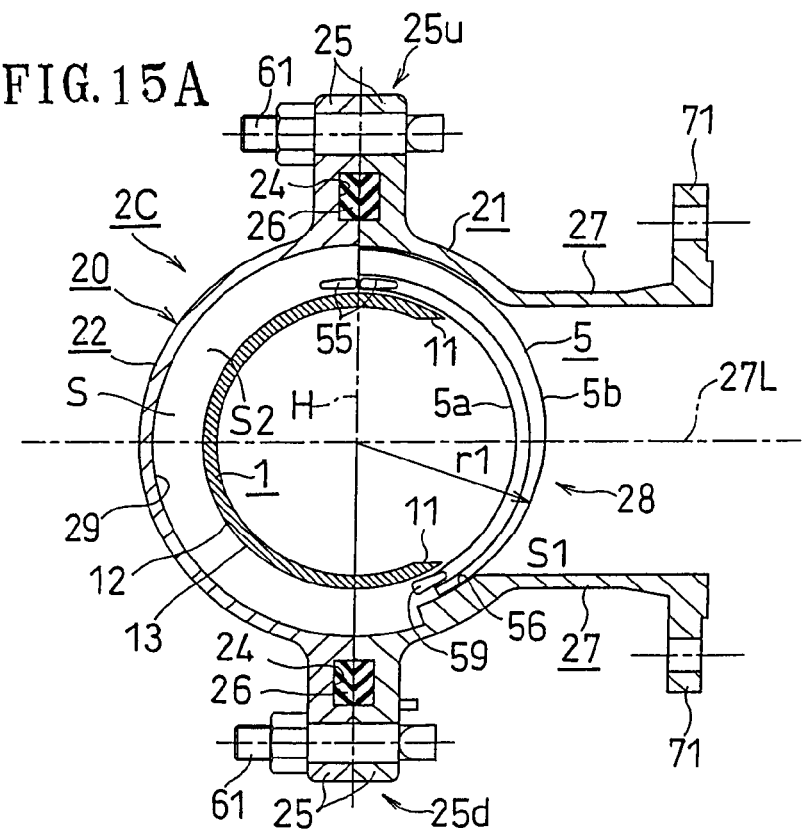
FIG. 15A and FIG. 15B are transverse sectional views each showing a branching unit of the sixth embodiment.

The valve body of FIG. 15A has an arc shape in cross section, which can reciprocate along the circumferential direction of the existing pipe 1 between the valve closing position in which the opening 11 is covered as well as the branch hole 28 is closed and the valve opening position in which the opening 11 is uncovered and the opening 11 and the branch hole 28 are connected.

Figure 15B:
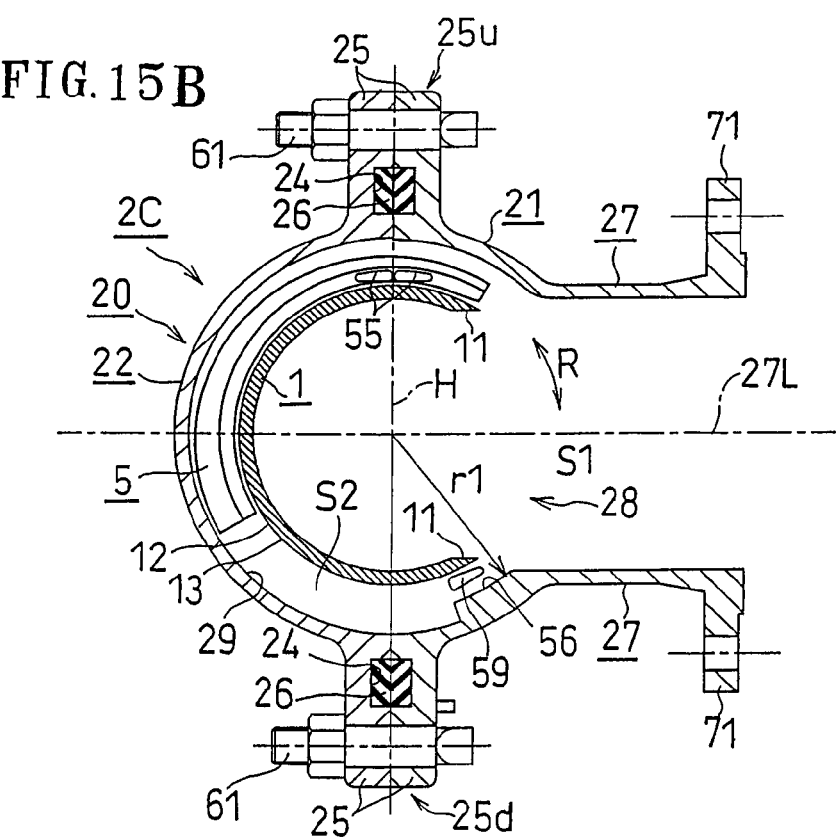

The valve body 5 and the valve seat 56 are formed so that a distance between the valve body 5 and the valve seat 56 in the radial direction of the existing pipe 1 becomes small as the valve body 5 moves rotationally from the valve opening position of FIG. 15B to the valve closing position of FIG. 15A. The valve seat 56 has the contact surface 56f touching the valve body 5, which is formed so that a curvature radius r1 at the contact surface 56f becomes small continuously as well as gradually as the valve body 5 comes close from the valve opening position to the valve closing position.

In this embodiment, the first contact surface 5f of the valve body 5 of FIG. 16B, and FIG. 17A to FIG. 17C is provided with a rubber lining (member for watertight) contacting the first contact surface 56f of the valve seat 56 and sealing. It is preferred that the rubber lining 5r is integrally formed at metal part of the valve body 5 in vulcanization molding of rubber. In this case, the sealing member is hard to be peeled.

The rubber lining 5r may cover a whole metal part of the valve body 5. In this case, the driven gear 51 of the valve body 5 is also covered with the rubber lining 5r. Although coating of the surface of the driven gear 51 is easy to be damaged, the rubber lining 5r is hard to be damaged in coating with the driven gear 51.

In the valve closing position of FIG. 15A, a pressing portion 59 pressing the valve body 5 outward in the radial direction so that the valve body 5 is pressed against the valve seat 56 as the valve body 5 further proceeds in the valve closing direction is integrally formed with the first separate casing 21. The pressing portion 59 combines pressing the valve body 5 and a stopper for preventing the valve body 5 from overrunning in the valve closing direction.

Figure 16A:
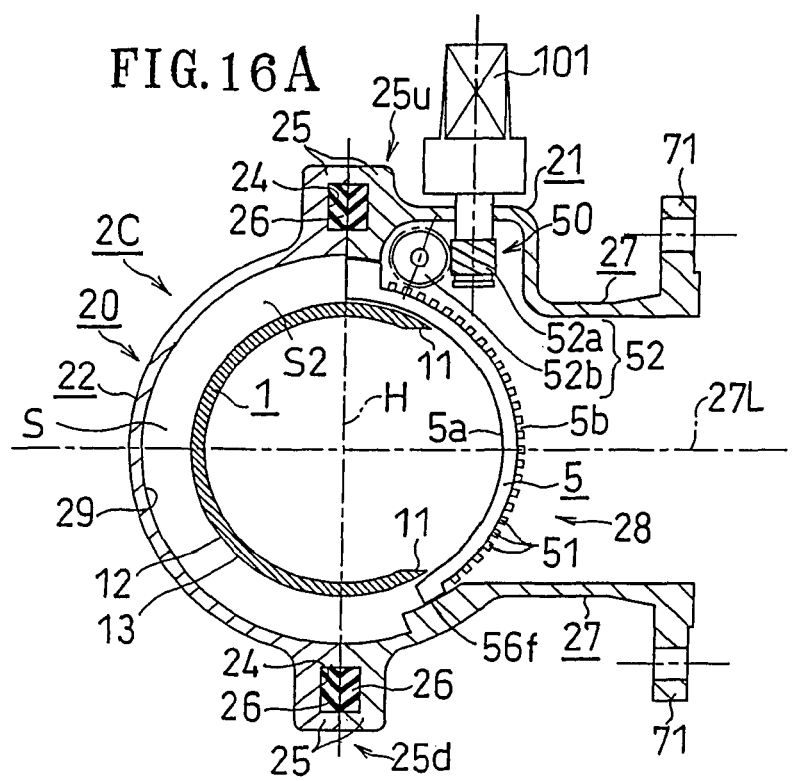
FIG. 16A and FIG. 16B are transverse sectional views each showing the branching unit of the sixth embodiment.
Figure 16B:
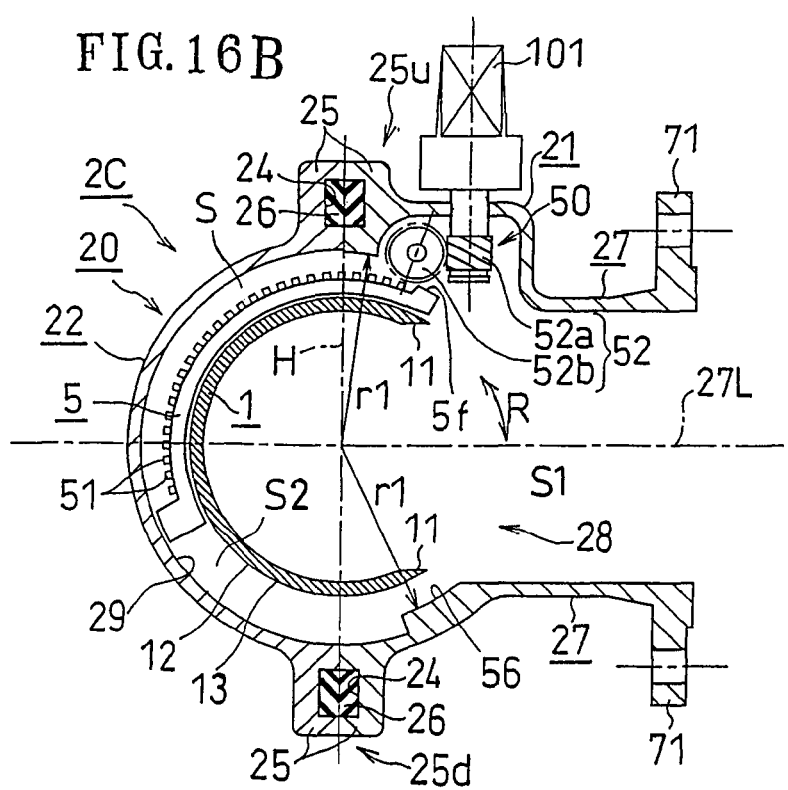

As shown in FIG. 16A, the valve body 5 comprises a concave surface 5a which is curved along the outer circumferential surface 13 of the existing pipe 1 and a convex surface 5b facing the branch hole 28 in the valve closing position. The driven gear is formed at the convex surface 5b of the valve body 5.

A contact surface 5f (FIG. 16B) touching the valve seat 56 in the convex surface 5b more protrudes than the surface of the driven gear 51 in the radial direction C1 of the existing pipe 1.

As shown in FIG. 15A, accommodating space S is provided between the inner circumferential surface 29 of the first and second separate casings 21, 22 and the outer circumferential surface 13 of the existing pipe 1.

A stopper preventing the valve body 5 from overrunning in the valve opening direction may be provided at the sealing case 20.

Seventh Embodiment:

FIG. 18A to FIG. 19B each shows a seventh embodiment.

Figure 18A:
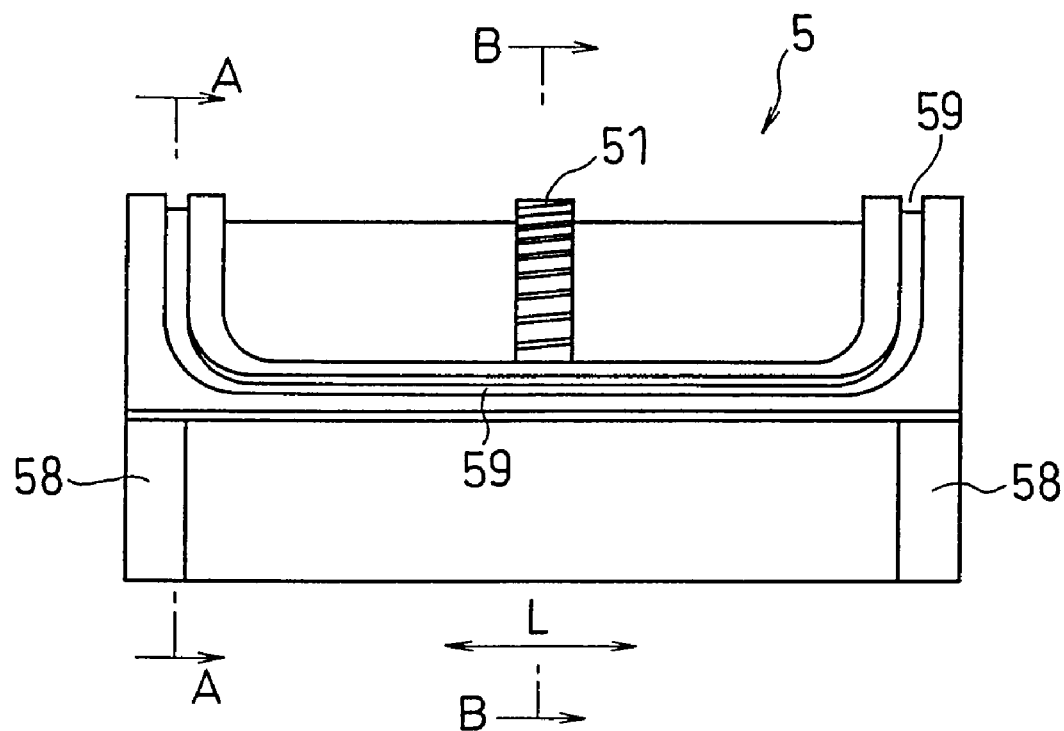
FIG. 18A is a front view and FIG. 18B is a sectional view, which each shows a valve body of a seventh embodiment.
Figure 18B:
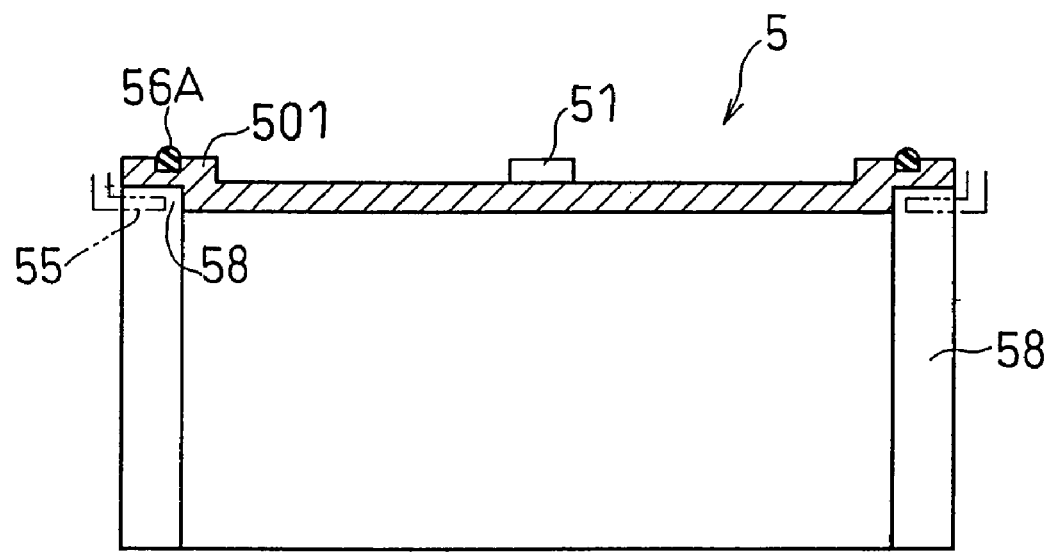
Figure 19A:
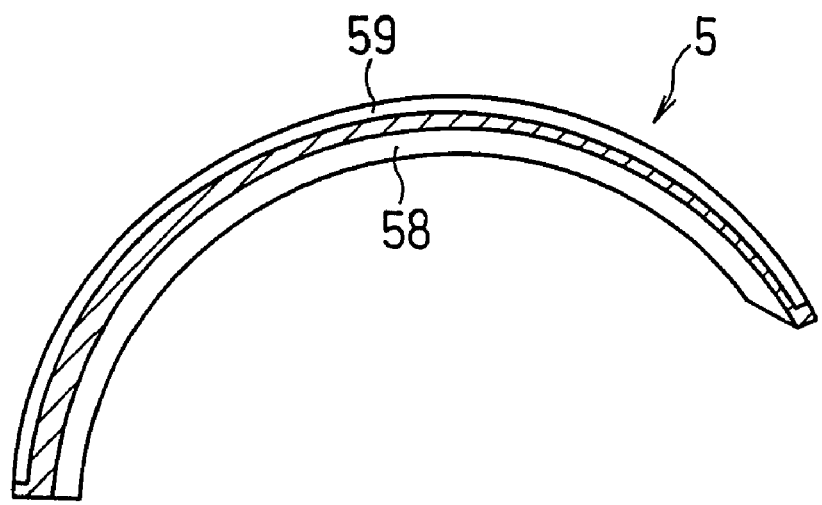
FIG. 19A is a sectional view taken in the line A-A of FIG. 18A.
Figure 19B:
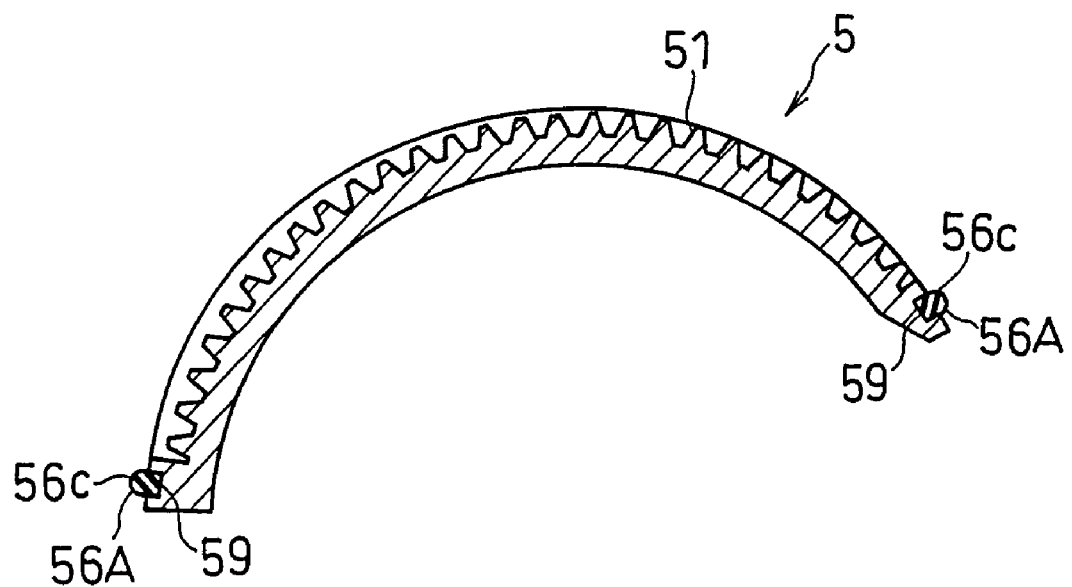
FIG. 19B is a sectional view taken in the line B-B of FIG. 18B.
Figure 20A:
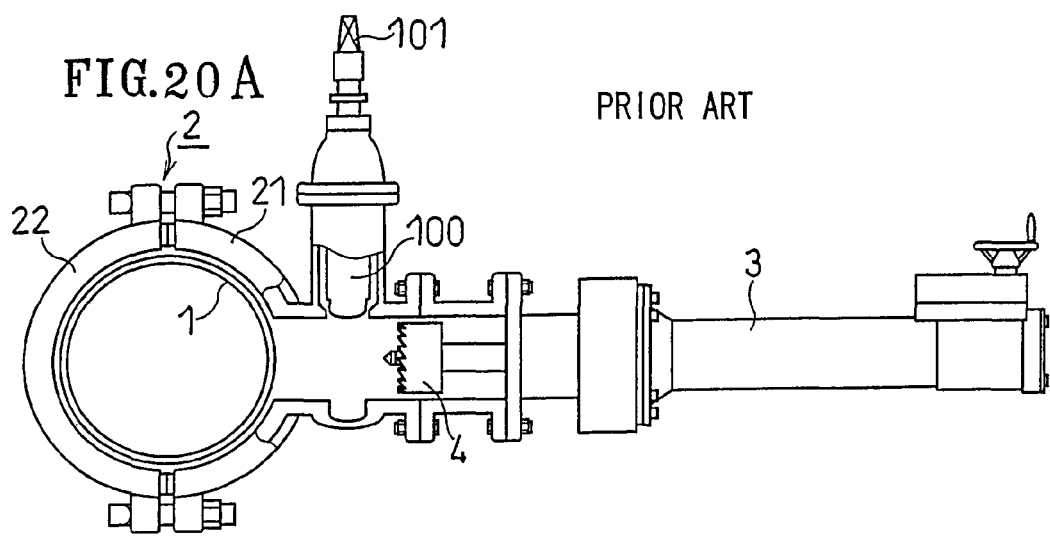
FIG. 20A to FIG. 20C are partially cut-away schematic side view each showing conventional method for boring without stopping passage of fluid.
Figure 20B:
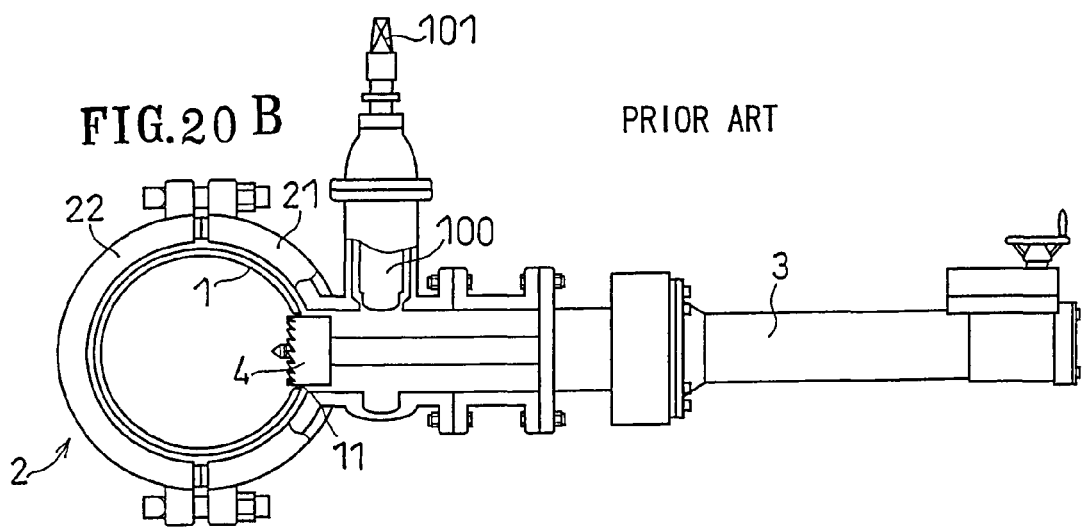
Figure 20C:
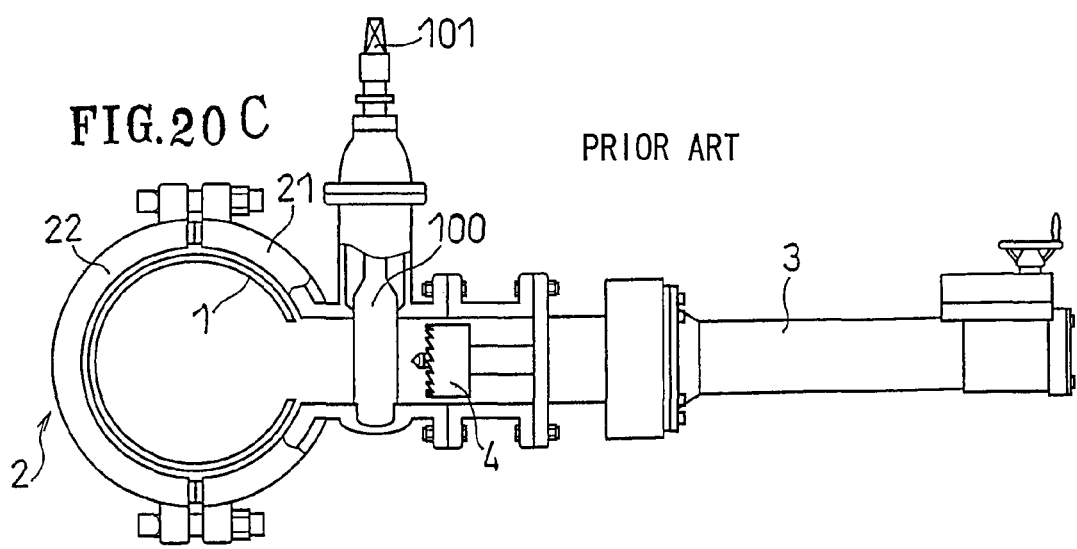

As shown in FIG. 18B and FIG. 19B, the valve body 5 is provided with the rubber ring 56A. The rubber ring 56A is fixed to an applied groove 59 which is endlessly formed at around the valve body 5. A top portion of the rubber ring 56A more protrudes than the driven gear 51 in the outward radial direction C.

As shown in FIG. 18B, both end of the valve body 5 in the tube axis direction L is provided with a guided groove 58 which pass a guide portion 55. The guided groove 58 of the valve body 5 being guided by the guide portion 55, the valve body 5 smoothly rotates in the circumferential direction R.

The valve body 5 of FIG. 18A is square-shaped as it is developed.

In about both end of the valve body 5 in the tube axis direction L, that is about the guided groove 58 and the applied groove 59, a ribbed reinforcing portion 50 thicker than an average thick part of the valve body 5 is provided. A pair of the ribbed reinforcing portion 501 suppresses a change in the curvature radius of the valve body 5 caused by water pressure, that is, suppresses bending of the valve body 5.

The drive gear 51 of FIG. 19B is thicker than an average thick portion of the valve body 5 of FIG. 19A. Therefore, being similar to the ribbed reinforcing portion 501, the driven gear 51 reinforces the valve body 5.

Figure 21A:
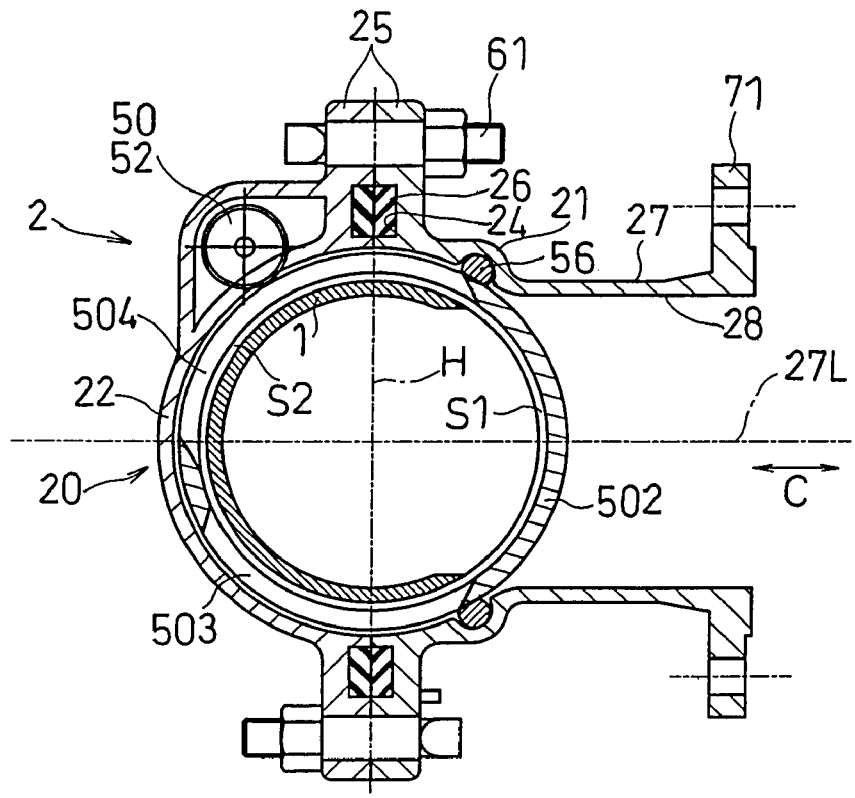
FIG. 21A and FIG. 21B are transverse sectional views each showing a branching unit of an eighth embodiment.
Figure 21B:
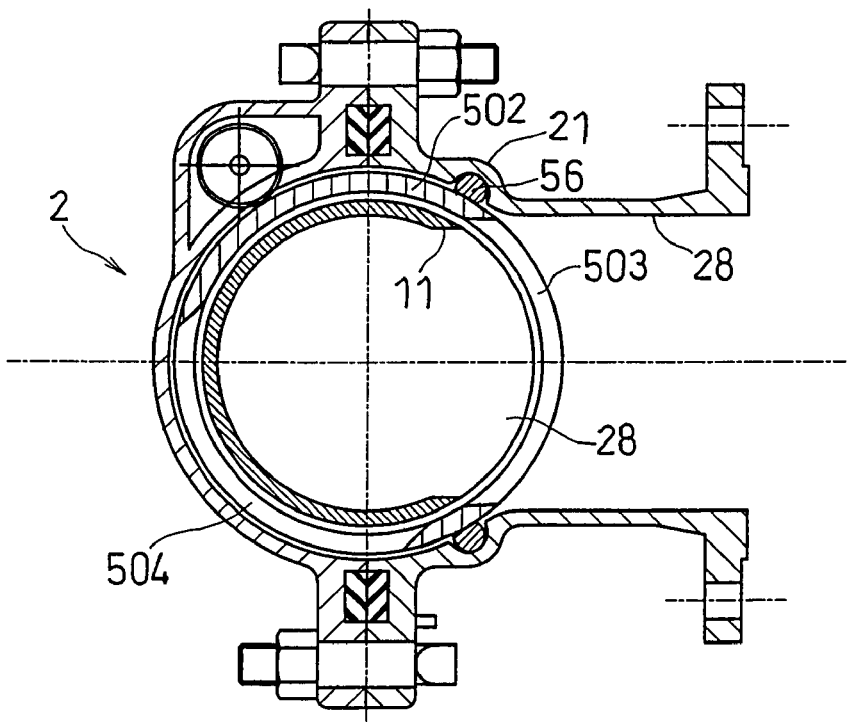
Figure 22:
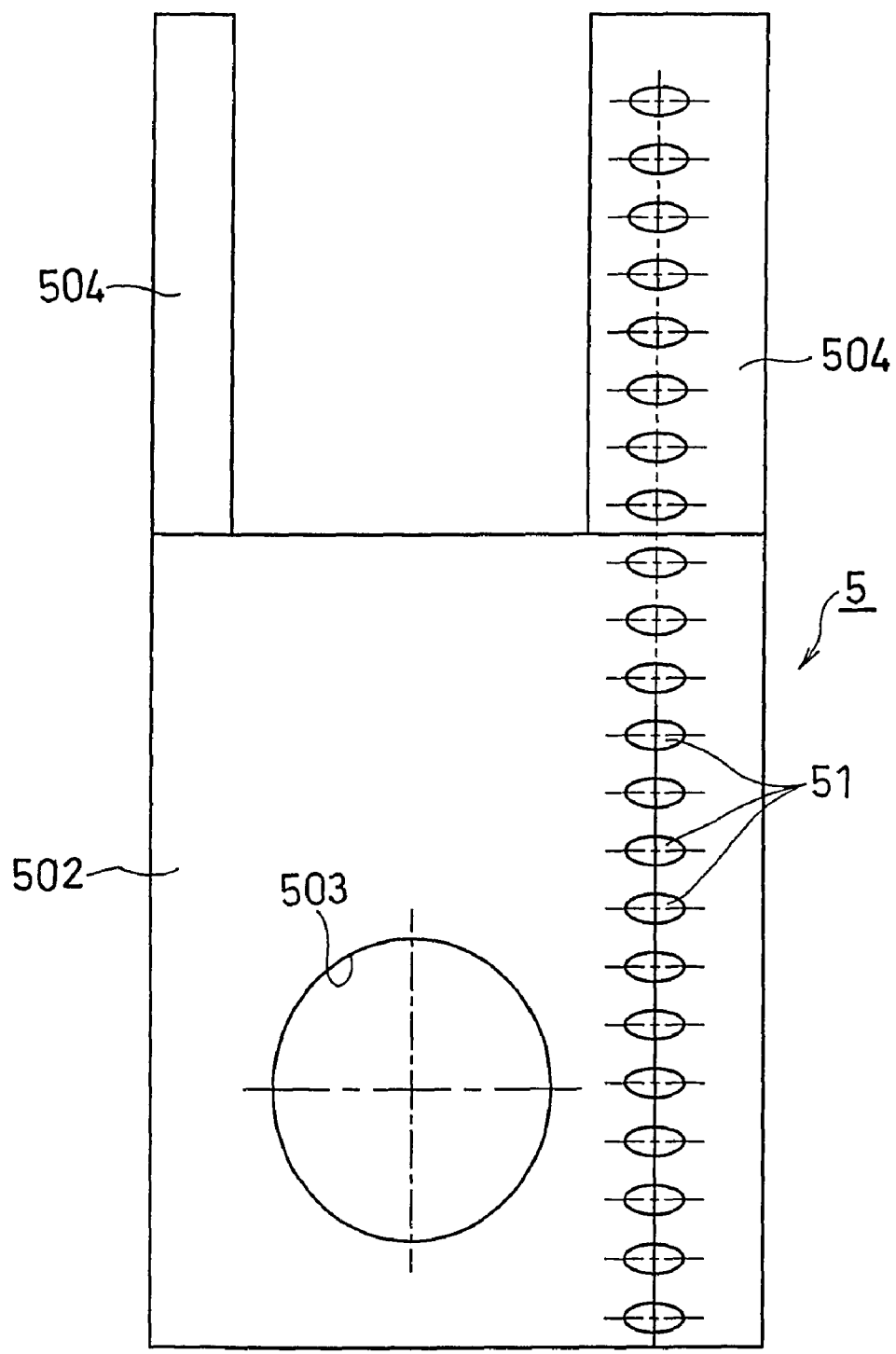
FIG. 22 is a front view showing a developed valve body of the eighth embodiment.

Eighth Embodiment:

FIG. 21A to FIG. 22 each shows an eighth embodiment.

As shown in FIG. 21A and FIG. 21B, the valve body 5 is made from a stainless steel plate material as endless circle. An arc shape part 502 in section of the valve body 5 closes the branch hole 28.

As shown in the development view of FIG. 22, an about circular through-hole 503 is formed in the valve body 5. As shown in FIG. 21B, being larger than the opening 11 formed in the existing pipe 1, the through-hole 503 opens the branch hole 28 to connect the opening hole 11 to the inside of the existing pipe 1.

A strip-shaped portion 504 is connected to the part 502 of the valve body 5 shown as a development view in FIG. 22. The valve body 5 is provided with numbers of small through holes comprising the driven gear 51 in regular pitch.

In the invention, a sealing case of the branching unit may be integrally formed with a sealing case for inserting valve.

Industrial Applicability

The branching unit for boring without stopping passage of fluid is applicable to extract a branch from an existing pipe such as water or gas pipe.

The invention claimed is:

1. A branching unit for boring without stopping passage of fluid, which is suitable for forming an opening at a pipe wall by boring a part of the pipe wall of an existing pipe using a drill machine having a hole saw to connect a branch pipe to the existing pipe, comprising:
   a sealing case including a first separate casing and a second separate casing separated in a circumferential direction of the existing pipe as well as surrounding a part of the existing pipe, and a branch pipe portion formed integrally with the first separate casing as well as projecting and branching off in a radial direction of the existing pipe;
   a valve body having an arc shape in cross section which opens and closes a branch hole of the branch pipe portion by rotating along the circumferential direction of the existing pipe between an inner circumferential surface of the sealing case and an outer circumferential surface of the existing pipe;
   a valve seat formed at the inner circumferential surface in the first separate casing, the valve body touching the valve seat in a valve closing state; and
   a rotation mechanism for rotating the valve body,
   wherein the rotation mechanism comprises an operation gear rotationally operated from an outside of the sealing case and a driven gear meshed with the operation gear,
   the driven gear is rotated by the rotation of the operation gear in the circumferential direction, the valve body being reciprocated to open and close the branch hole, and
   the operation gear is provided at the second separate casing including no branch pipe portion.

2. A branching unit for boring without stopping passage of fluid, which is suitable for forming an opening at a pipe wall by boring a part of the pipe wall of an existing pipe using a drill machine having a hole saw to connect a branch pipe to the existing pipe, comprising:
   a sealing case including a first separate casing and a second separate casing separated in a circumferential direction of the existing pipe as well as surrounding a part of the existing pipe, and a branch pipe portion formed integrally with the first separate casing as well as projecting and branching off in a radial direction of the existing pipe;
   a valve body having an arc shape in cross section which opens and closes a branch hole of the branch pipe portion by rotating along the circumferential direction of the existing pipe between an inner circumferential surface of the sealing case and an outer circumferential surface of the existing pipe;
   a valve seat formed at the inner circumferential surface in the first separate casing, the valve body touching the valve seat in a valve closing state; and
   a rotation mechanism for rotating the valve body,
   wherein the rotation mechanism comprises an operation gear rotationally operated from an outside of the sealing case and a driven gear meshed with the operation gear, and
   the driven gear is rotated by the rotation of the operation gear in the circumferential direction, the valve body being reciprocated to open and close the branch hole,
   wherein the sealing case consists of two separate casings of the plural separate casings and the two separate casings are connected at connection portions at an inclined surface which inclines to a virtual flat surface orthogonal to an axis of the branch pipe portion,
   the two separate casings being connected at the inclined surface, a distance between the branch pipe portion and the connection portions in the first separate casing is larger at an upper portion than at a lower portion, and
   the operation gear is arranged at the upper portion.

3. A branching unit for boring without stopping passage of fluid according to claim 2,
   wherein the operation gear comprises a worm whose axis is set approximately in the radial direction of the existing pipe and a worm wheel whose axis is set in parallel to an axial direction of the existing pipe, and
   the driven gear is formed at the valve body and meshed with the worm wheel.

4. A branching device for boring without stopping passage of fluid, which is suitable for forming an opening at a pipe wall by boring a part of the pipe wall of an existing pipe using a drill machine having a hole saw to connect a branch pipe to the existing pipe, comprising:
   a sealing case including plural numbers of separate casings separated in a circumferential direction of the existing pipe as well as surrounding a part of the existing pipe, and a branch pipe portion formed integrally with a first separate casing of the plural separate casings as well as projecting and branching off in a radial direction of the existing pipe;
   a valve body having an arc shape in cross section which opens and closes a branch hole of the branch pipe portion by rotating along the circumferential direction of the existing pipe between an inner circumferential surface of the sealing case and an outer circumferential surface of the existing pipe;

a valve seat formed at the inner circumferential surface in the first separate casing, the valve body touching the valve seat in a valve closing state; and a rotation mechanism for rotating the valve body, wherein the valve body includes a concave surface which is curved along the outer circumferential surface of the existing pipe, a convex surface facing the branch hole in the valve closing position and being provided on an opposite side of the valve body than the concave surface, and an edge defining a spread of each of the concave surface and the convex surface, the rotation mechanism comprises an operation gear rotationally operated from an outside of the sealing case and a driven gear formed on the convex surface of the valve body without being formed on the concave surface and the edge, wherein the driven gear is meshed with the operation gear, being rotated by the rotation of the operation gear in the circumferential direction, the valve body being reciprocated to open and close the branch hole, a circumferential contact surface touching the valve seat in the convex surface, wherein the circumferential contact surface protrudes more than the surface of the driven gear in the radial direction of the existing pipe, and wherein the driven gear is positioned within an area surrounded by the circumferential contact surface without being positioned outside the area.

5. A branching unit for boring without stopping passage of fluid according to claim 4, further comprising:

a pressing portion pressing the valve body outward in the radial direction so that the valve body is pressed against the valve seat as the valve body further proceeds in the valve closing direction in the valve closing position.

6. A branching unit for boring without stopping passage of fluid according to claim 4, wherein a watertight member is provided at a contact surface of the valve body which touches the valve seat.

7. A branching unit for boring without stopping passage of fluid according to claim 4, wherein a guide portion guiding the rotation of the valve body is provided at the sealing case, a guided groove guided by the guide portion is provided at both ends of the valve body in an axial direction of the existing pipe, and portions of the valve body forming the guided groove protrude so as to come close to the sealing case, a pair of ribbed reinforcing portions extending in a circumferential direction along the guided groove being formed integrally with the valve body.

8. A branching unit for boring without stopping passage of fluid according to claim 4, wherein a rubber ring for sealing is mounted along around the branch hole of the branch pipe portion in the first separate casing including the branch pipe portion.

9. A branching unit for boring without stopping passage of fluid according to claim 4, wherein the valve seat is a circumferential rubber ring.

10. A branching unit for boring without stopping passage of fluid according to claim 4, wherein the valve body has an arc shape in cross section, which can reciprocate along the circumferential direction of the existing pipe between a valve closing position in which the opening is covered as well as the branch hole is closed and a valve opening position in which the opening is uncovered and the opening and the branch hole are connected, and wherein the valve body and the valve seat are formed so that a distance between the valve body and the valve seat in the radial direction of the existing pipe becomes small as the valve body moves rotationally from the valve opening position to the valve closing position.

11. A branching unit for boring without stopping passage of fluid according to claim 10, wherein the valve seat has a contact surface touching the valve body, which is formed so that a curvature radius at the contact surface becomes small continuously as well as gradually as the valve body comes close from the valve opening position to the valve closing position.

12. A branching unit for boring without stopping passage of fluid according to claim 4, wherein the rotation mechanism comprises an operation gear rotationally operated from the outside of the sealing case and a driven gear meshed with the operation gear, and wherein the driven gear is rotated by the rotation of the operation gear in the circumferential direction, the valve body being reciprocated to open and close the branch hole.

13. A branching unit for boring without stopping passage of fluid according to claim 12, wherein the operation gear is provided at a second separate casing including no branch pipe portion.

* * * * *